(12) United States Patent
Motowaki

(10) Patent No.: US 11,090,817 B2
(45) Date of Patent: Aug. 17, 2021

(54) ROBOT HAND, ROBOT AND ROBOT SYSTEM CAPABLE OF GRIPPING WORKPIECE, AND METHOD OF ROTATING AND INSERTING WORKPIECE INTO HOLE

(71) Applicant: Fanuc Corporation, Yamanashi (JP)

(72) Inventor: Yoshio Motowaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 268 days.

(21) Appl. No.: 16/288,422

(22) Filed: Feb. 28, 2019

(65) Prior Publication Data

US 2019/0270207 A1 Sep. 5, 2019

(30) Foreign Application Priority Data

Mar. 2, 2018 (JP) .............................. JP2018-037608

(51) Int. Cl.
| | | |
|---|---|---|
| B25J 15/10 | (2006.01) | |
| B25J 9/16 | (2006.01) | |
| B25J 17/02 | (2006.01) | |
| B25J 19/00 | (2006.01) | |

(52) U.S. Cl.
CPC .......... B25J 15/103 (2013.01); B25J 9/1664 (2013.01); B25J 17/0208 (2013.01); B25J 17/0258 (2013.01); B25J 19/0004 (2013.01); *G05B 2219/39574* (2013.01)

(58) Field of Classification Search
CPC . G05B 2219/39568; G05B 2219/39574; B25J 15/103; B25J 17/0208; B25J 9/1664; B25J 13/085; B25J 15/02; B25J 17/0258; B25J 19/0004; B25J 19/023; B25J 9/023; B25J 9/1697
See application file for complete search history.

(56) References Cited

U.S. PATENT DOCUMENTS

| | | | |
|---|---|---|---|
| 9,687,985 B2 | 6/2017 | Ueno et al. | |
| 9,815,137 B2* | 11/2017 | Aoki | ..................... B23K 11/252 |
| 10,120,364 B2* | 11/2018 | Abdallah | .............. G05B 19/402 |
| 10,569,426 B2* | 2/2020 | Komatsu | .............. B25J 15/0433 |
| 2004/0086364 A1 | 5/2004 | Watanabe et al. | |
| 2005/0276182 A1* | 12/2005 | Nakada | .............. G11B 7/08582 |
| | | | 369/47.1 |

(Continued)

FOREIGN PATENT DOCUMENTS

| | | |
|---|---|---|
| CN | 102990642 A | 3/2013 |
| CN | 104044152 A | 9/2014 |

(Continued)

*Primary Examiner* — Behrang Badii
*Assistant Examiner* — Daniel L Greene
(74) *Attorney, Agent, or Firm* — RatnerPrestia

(57) ABSTRACT

A robot hand capable of rotating and inserting a workpiece into a hole, while preventing a workpiece from being damaged when the workpiece is gripped. The robot hand includes a first hand section, a second hand section provided with a workpiece gripping section capable of gripping a workpiece, an elastic member configured to connect the first hand section and the second hand section in an elastically displaceable manner, and a movement restricting mechanism configured to releasably restrict a rotation movement of an elastic displacement of the second hand section with respect to the first hand section.

10 Claims, 18 Drawing Sheets

(56) References Cited

U.S. PATENT DOCUMENTS

| | | | |
|---|---|---|---|
| 2006/0012197 A1* | 1/2006 | Anderson | B25J 15/0028 294/106 |
| 2007/0022582 A1* | 2/2007 | Carnevali | F16M 11/14 24/523 |
| 2007/0144299 A1* | 6/2007 | Okazaki | B25J 9/1075 74/490.1 |
| 2013/0061695 A1 | 3/2013 | Sato | |
| 2014/0028118 A1* | 1/2014 | Sakano | B25J 9/1612 310/12.14 |
| 2014/0277720 A1 | 9/2014 | Izumi et al. | |
| 2015/0234375 A1* | 8/2015 | Takayama | G05B 19/4086 700/187 |
| 2017/0183047 A1* | 6/2017 | Takagi | B62D 57/032 |
| 2017/0274536 A1* | 9/2017 | Takeuchi | B25J 19/063 |

FOREIGN PATENT DOCUMENTS

| | | | |
|---|---|---|---|
| CN | 104889999 A | 9/2015 | |
| CN | 106514614 A | 3/2017 | |
| JP | 63207530 A | 8/1988 | |
| JP | 06143054 A | 5/1994 | |
| JP | 07032286 A | 2/1995 | |
| JP | 2002254257 A | 9/2002 | |
| JP | 2017-074638 A | 4/2017 | |

\* cited by examiner

ROBOT HAND, ROBOT AND ROBOT SYSTEM CAPABLE OF GRIPPING WORKPIECE, AND METHOD OF ROTATING AND INSERTING WORKPIECE INTO HOLE

CROSS-REFERENCE TO RELATED APPLICATIONS

This application is a new U.S. Patent Application that claims benefit of Japanese Patent Application No. 2018-037608, filed Mar. 2, 2018, the disclosure of this application is being incorporated herein by reference in its entirety for all purposes.

BACKGROUND OF THE INVENTION

1. Field of the Invention

The present invention relates to a robot hand capable of gripping a workpiece, a robot, a robot system, and a method of rotating and inserting a workpiece into a hole.

2. Description of the Related Art

There are known robot hands mounted to a robot arm via an elastic member (JP 2017-74638 A, for example).

A robot hand capable of mounting a workpiece to an object while rotating the workpiece and preventing the workpiece from being damaged when gripped has been in demand.

SUMMARY OF THE INVENTION

According to an aspect of the present disclosure, a robot hand includes a first hand section, a second hand section including a workpiece gripping section configured to grip a workpiece, an elastic member configured to connect the first hand section and the second hand section to each other in an elastically displaceable manner, and a movement restricting mechanism configured to releasably restrict a rotation movement of an elastic displacement of the second hand section with respect to the first hand section.

According to the present disclosure, it is possible to prevent a workpiece other than a gripping target from being damaged by an operation of gripping a workpiece by a robot hand, increase a service life of the robot hand, and execute a task of mounting the workpiece gripped by the robot hand to a workpiece mounting member while rotating the workpiece.

DETAILED DESCRIPTION

Figure 1:
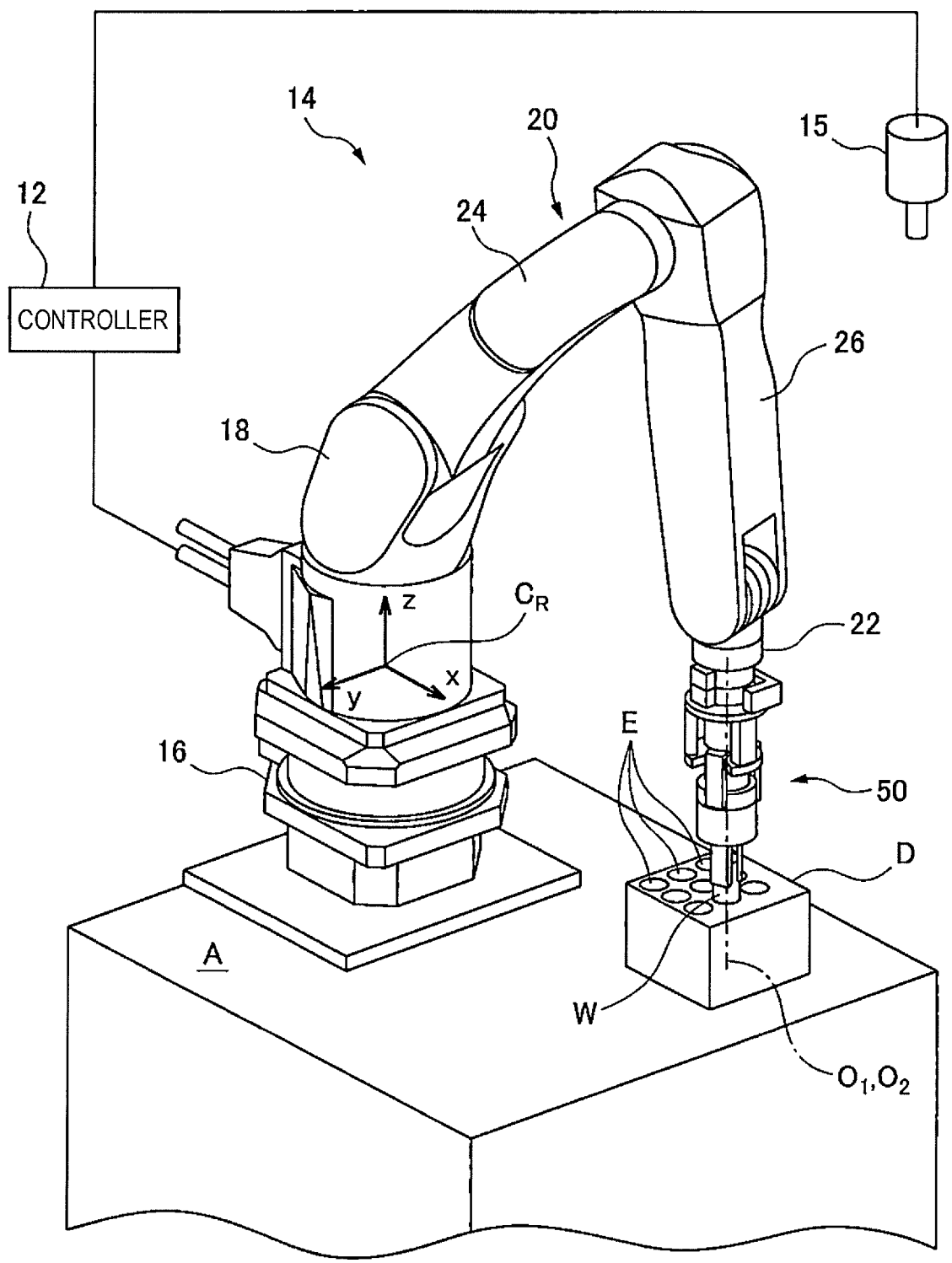
FIG. 1 is a view of a robot system according to an embodiment.

Embodiments of the present disclosure will be described in detail below with reference to the drawings. Note that, in the various embodiments described below, the same reference numerals will be given to similar components, and redundant descriptions thereof will be omitted. First, a robot system 10 according to an embodiment will be described with reference to FIG. 1 and FIG. 2.

The robot system 10 includes a controller 12, a robot 14, and a vision sensor 15. The controller 12 includes e.g. a processor and memory, and controls each component of the robot 14 and the vision sensor 15.

The robot 14 is e.g. a vertical articulated robot, and includes a base 16, a rotating torso 18, a robot arm 20, a wrist 22, and a robot hand 50. The base 16 is fixed on a work table A. The rotating torso 18 is provided at the base 16 so as to be rotatable about a vertical axis.

The robot arm 20 includes a lower arm 24 pivotally connected to the rotating torso 18 and an upper arm 26 pivotally connected to a distal end of the lower arm 24. The wrist 22 is provided at a distal end of the upper arm 26, and rotatably supports the robot hand 50.

Figure 2:
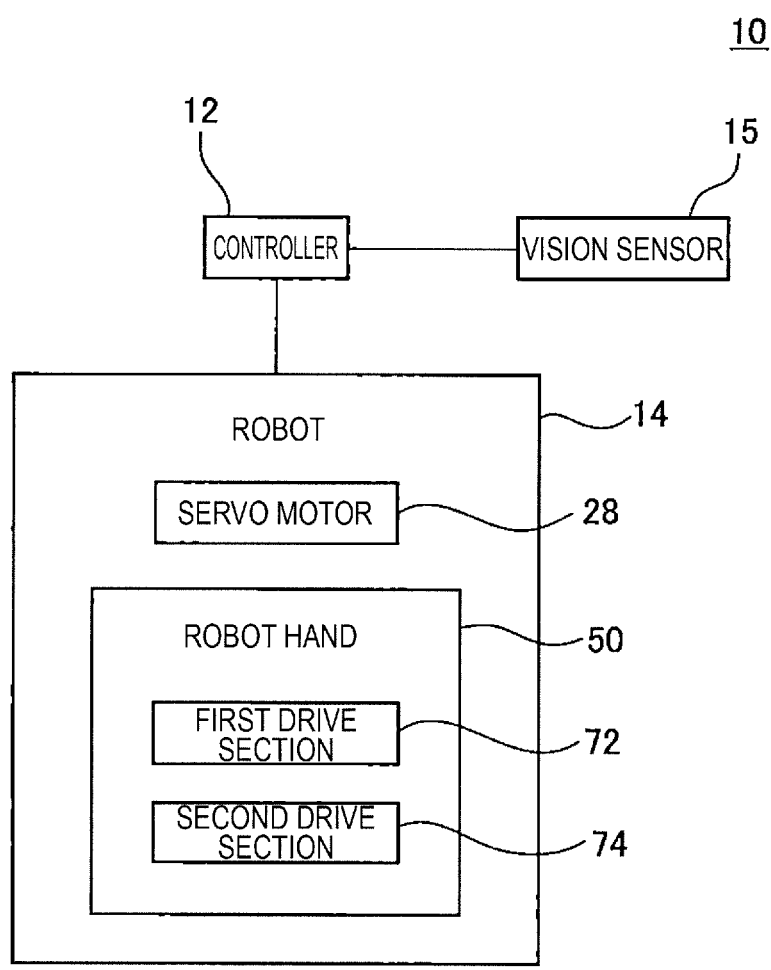
FIG. 2 is a block diagram of the robot system illustrated in FIG. 1.

The robot 14 includes a plurality of servomotors 28 (FIG. 2). These servomotors 28 are built in the base 16, the rotating torso 18, the robot arm 20, and the wrist 22, respectively.

The controller 12 can send commands to the servomotors 28 using a robot coordinate system $C_R$ as a reference, and operate the rotating torso 18, the robot arm 20, and the wrist 22 so as to arrange the robot hand 50 at a desired position and orientation in the robot coordinate system $C_R$.

In the present embodiment, the robot coordinate system $C_R$ is set for the robot 14 such that an origin thereof is disposed at the base 16, z-axis thereof is parallel with the vertical direction, and the rotating torso 18 is rotated about the z-axis.

Figure 5:
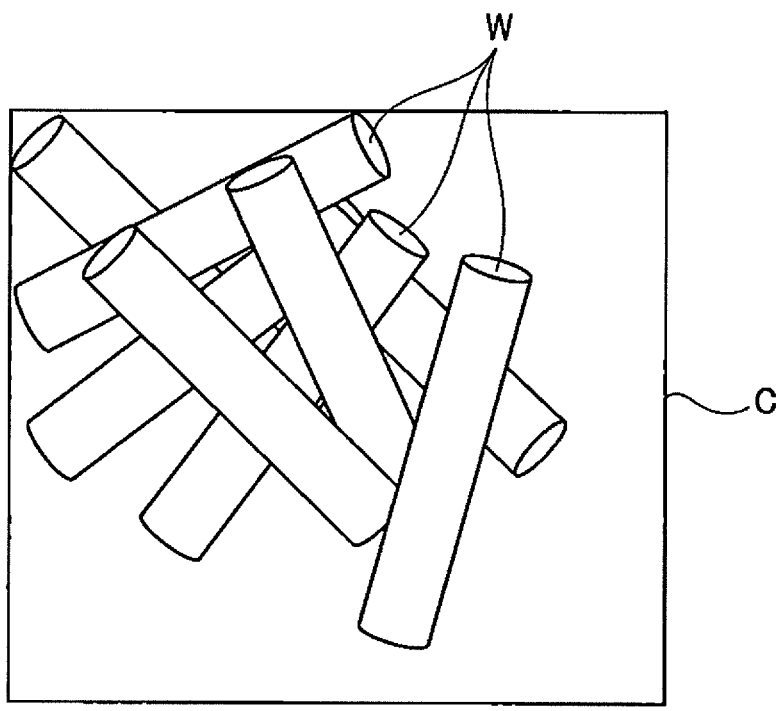
FIG. 5 illustrates workpieces piled in a container.

The vision sensor 15 is e.g. a three-dimensional vision sensor, and includes e.g. an imaging sensor such as a charge-coupled device (CCD) or a complementary metal-oxide-semiconductor (CMOS), an optical lens such as a focus lens, an image processing processor. The vision sensor 15 detects a position and orientation of a workpiece W piled in a container C (FIG. 5), in accordance with a command from the controller 12. Note that, in the present embodiment, the workpiece W is a column-shaped member having a center axis.

Next, the robot hand 50 will be described with reference to FIG. 3. Note that, in the following description, the axial direction indicates a direction along an axis $O_1$ in the drawings, the radial direction indicates a radial direction of a circle centered about the axis $O_1$, and the circumferential direction indicates a circumferential direction of the circle. Further, in the following description, the direction indicated by an arrow B in the drawings is referred to as an axially frontward direction, for the sake of convenience.

The robot hand 50 includes a first hand section 52, a second hand section 53, an elastic member 56, and a movement restricting mechanism 60. The first hand section 52, the second hand section 53, and the elastic member 56 are aligned in the axial direction.

The first hand section 52 has the axis $O_1$, and includes a mounting section 62, a proximal end flange 64, a distal end flange 66, a plurality of columns 68, and a main body 70. The mounting section 62 is detachably mounted to the wrist 22. The proximal end flange 64 extends radially outside from an axially front end of the mounting section 62.

The distal end flange 66 is disposed separated axially frontward from the proximal end flange 64. The plurality of columns 68 are disposed so as to align in the circumferential direction, and extend in the axial direction between the proximal end flange 64 and the distal end flange 66.

The main body 70 is disposed between the proximal end flange 64 and the distal end flange 66, and is fixed to the proximal end flange 64 and the distal end flange 66. The main body 70 is hollow, and a first drive section 72 described later is built in the main body 70. The mounting section 62, the proximal end flange 64, and the main body 70 are circular members having the axis $O_1$.

The second hand section 53 is connected to the first hand section 52 via the elastic member 56. The second hand section 53 includes a main body 54 and a workpiece gripping section 58. The main body 54 is a circular column shaped hollow member having an axis $O_2$. A total of three holes 84 are formed at an outer circumferential surface 54a of the main body 54.

These holes 84 are disposed so as to align about the axis $O_2$ at a substantially equal interval (i.e., the interval of substantially 120°), and configured to receive respective projections 78 described later. Note that, in FIG. 3, only one of the three holes 84 is illustrated.

The workpiece gripping section 58 includes a plurality of workpiece gripping claws 59. The workpiece gripping claws 59 each have a substantially L-shaped profile, and are provided at the main body 54 so as to be movable in directions toward and away from the axis $O_2$. In the present embodiment, a total of three workpiece gripping claws 59 are disposed so as to align in the circumferential direction. The workpiece gripping claws 59 can grip and release the workpiece W (FIG. 1).

The main body 54 includes a second drive section 74 therein. The second drive section 74 drives the workpiece gripping claws 59 so as to open and close, in accordance with a command from the controller 12. In the present embodiment, the second drive section 74 is a pneumatic or hydraulic cylinder.

The elastic member 56 is a circular column shaped member, and connects the first hand section 52 and the second hand section 53 to each other in an elastically displaceable manner. Specifically, the elastic member 56 is connected to the distal end flange 66 of the first hand section 52 at its axially rear end, and connected to the main body 54 of the second hand section 53 at its axially front end.

For example, the elastic member 56 is comprised of an elastic material such as rubber or urethane, while the first hand section 52 and the second hand section 53 (main body 54) are comprised of e.g. a metal. In this case, the elastic member 56 has a modulus of elasticity that is less than the first hand section 52 and the second hand section 53 (main body 54).

Alternately, the elastic member 56 may be comprised of a flexible member such as a coil spring. In this way, the elastic member 56 is configured to elastically deform more readily than the first hand section 52 and the second hand section 53 (main body 54).

The movement restricting mechanism 60 releasably restricts a rotation movement of the second hand section 53, which is elastically displaceable with respect to the first hand section 52, about the axis $O_1$ (i.e., in circumferential direction). Specifically, the movement restricting mechanism 60 includes a plurality of movement restricting claws 75 and the first drive section 72.

The movement restricting claws 75 are provided at the main body 70 of the first hand section 52 so as to be movable in directions toward and away from the axis $O_1$. In the present embodiment, a total of three movement restricting claws 75 are disposed so as to align in the circumferential direction at a substantially equal interval.

More specifically, each movement restricting claw 75 includes an arm 76 and the projection 78. The arm 76 includes a first part 80 extending in the radial direction, and a second part 82 extending axially frontward from a radially outer end of the first part 80. In the present embodiment, the arm 76 has substantially the same L-shaped profile as the workpiece gripping claw 59.

The projections 78 are respectively provided at the arms 76. In the present embodiment, each projection 78 is circular column shaped, and fixedly provided on a radially inner surface 82a of the arm 76 so as to protrude radially inward from the surface 82a.

A tapered part 78a is formed at a distal end of the projection 78 such that the cross-sectional area of the projection 78 gradually decreases toward its distal end. One projection 78 is disposed to face one hole 84 formed in the main body 54 of the second hand section 53.

The first drive section 72 drives the movement restricting claws 75 so as to open and close, in accordance with a command from the controller 12. In the present embodiment, the first drive section 72 is a pneumatic or hydraulic cylinder.

When the first drive section 72 moves the movement restricting claws 75 toward the axis $O_1$ so as to bring the movement restricting claws 75 into a closed state, the movement restricting claws 75 are disposed at an engaged position. When the movement restricting claws 75 are disposed at the engaged position, the projections 78 of the movement restricting claws 75 are received in the corresponding holes 84.

Then, each projection 78 engages a wall face defining the hole 84 in a direction about the axis $O_1$ (i.e., the circumferential direction) and a direction of the axis $O_1$ (i.e., the axial direction). Further, the surface 82a of each arm 76 comes into contact with the outer circumferential surface 54a of the main body 54 in the radial direction.

Due to this, a rotation movement about the axis $O_1$ and translation movement in the direction of the axis $O_1$ and a direction intersecting the axis $O_1$ (e.g., the radial direction) of the elastic displacement of the second hand section 53 with respect to the first hand section 52 are restricted.

In other words, in the present embodiment, the movement restricting mechanism 60 restricts the elastic displacement in six-axis directions (a first axis direction along the axis $O_1$, a second axis direction orthogonal to the first axis, a third axis direction orthogonal to the first axis and the second axis, and directions about the first axis, the second axis, and the third axis) of the second hand section 53 with respect to the first hand section 52. When the projections 78 are inserted into the respective holes 84, the second hand section 53 is disposed at a predetermined initial position with respect to the first hand section 52.

When the second hand section 53 is disposed at the initial position, the first hand section 52 and the second hand section 53 are coaxially disposed with respect to the axis $O_1$, wherein the axis $O_1$ of the first hand section 52 and the axis $O_2$ of the second hand section 53 coincide with each other, and the second hand section 53 (e.g., the center position of the workpiece gripping claws 59 in the axial direction) separates axially frontward from the first hand section 52 (e.g., the center of the mounting section 62) by a predetermined distance.

On the other hand, when the first drive section 72 moves the movement restricting claws 75 away from the axis $O_1$ so as to bring the movement restricting claws 75 into an open state, the movement restricting claws 75 are disposed at the disengaged position. When the movement restricting claws 75 are disposed at the disengaged position, the projections 78 of the movement restricting claws 75 are disengaged from the corresponding holes 84, and separated radially outside from the outer circumferential surface 54a of the main body 54, as illustrated in FIG. 3.

When a force is applied to the second hand section 53 in this state, the elastic member 56 is elastically deformed, whereby the second hand section 53 is displaced with respect to the first hand section 52 in accordance with the applied force. In this way, the rotation movement and the translation movement of the second hand section 53 with respect to the first hand section 52 are allowed by the action of the elastic member 56, when the movement restricting claws 75 are disposed at the disengaged position.

Next, the operation of the robot system 10 will be described with reference to FIG. 1 to FIG. 7. The robot system 10 according to the present embodiment carries out a work of picking up the workpiece W piled in the container C illustrated in FIG. 5 by the robot hand 50, and inserting the picked-up workpiece W into a mounting hole E formed in a workpiece mounting member D illustrated in FIG. 1. Note that, in the present embodiment, the mounting hole E is circular.

Figure 4:
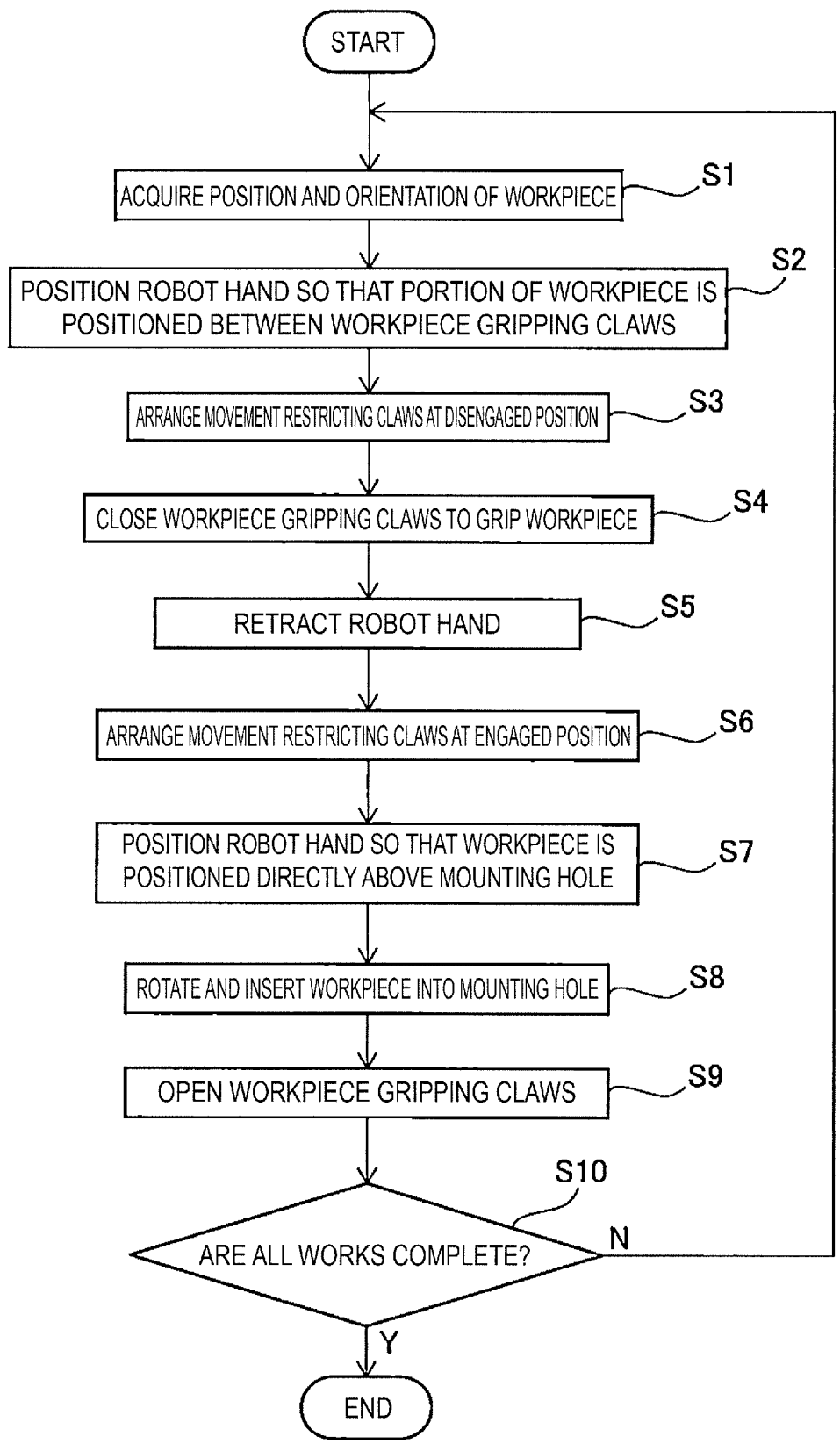
FIG. 4 is a flowchart illustrating an example of an operation flow of the robot system illustrated in FIG. 1.

The flow illustrated in FIG. 4 is started when the controller 12 receives an operation start command from an operator, a host controller, or a computer program. At the start of the flow illustrated in FIG. 4, the movement restricting claws 75 are disposed at the engaged position, and whereby the second hand section 53 is disposed at the initial position with respect to the first hand section 52.

When the second hand section 53 is disposed at the initial position, a reference point (e.g., the center position in the axial direction of the workpiece gripping claws 59) of the workpiece gripping claws 59 with respect to the wrist 22 of the robot 14 is determined. The memory of the controller 12 pre-stores information of the reference point of the workpiece gripping claws 59 with respect to the wrist 22 when the second hand section 53 is disposed at the initial position.

From the information of the reference point, the controller 12 can recognize the reference point of the workpiece gripping claws 59 in the robot coordinate system $C_R$ when the robot hand 50 is disposed at a desired position and orientation in the robot coordinate system $C_R$ in a state where the second hand section 53 is disposed at the initial position.

In step S1, the controller 12 operates the vision sensor 15 so as to acquire the position and the orientation of the workpiece W in the container C. Specifically, the controller 12 sends a position acquisition command to the vision sensor 15.

Upon receipt of the position acquisition command, the vision sensor 15 images the workpieces W piled in the container C, analyzes the captured image, and calculates the positions and the orientations in the robot coordinate system $C_R$ of the workpieces W within a field of view of the vision sensor 15. The vision sensor 15 sends the acquired information of the positions and the orientations of the workpieces W to the controller 12.

The controller 12 determines one workpiece W to be gripped, on the basis of the information of the positions and orientations of the workpieces W acquired by the vision sensor 15. For example, the controller 12 determines a workpiece W among the workpieces W piled in the container C, which is located most vertically upward, as the grip target.

Figure 6:
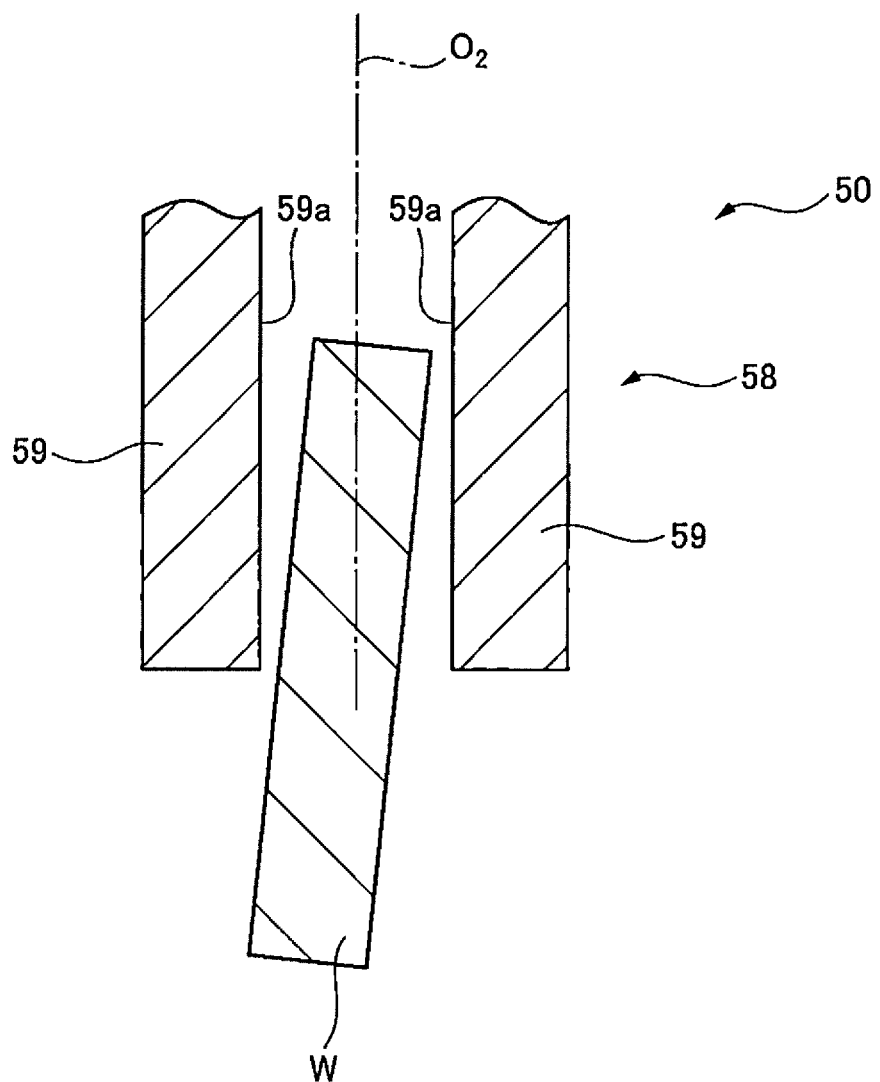
FIG. 6 illustrates a state when step S2 in FIG. 4 has ended.

In step S2, the controller 12 positions the robot hand 50 such that a portion of the workpiece W determined as the grip target in step S1 is between the workpiece gripping claws 59. FIG. 6 shows an example of a state when a portion of the workpiece W is positioned between the workpiece gripping claws 59.

In the state illustrated in FIG. 6, the workpiece W to be gripped is disposed with respect to the workpiece gripping claws 59 such that the workpiece W piled in the container C intersects the axis $O_2$ of the second hand section 53, a center axis of the workpiece W is inclined with respect to the axis $O_2$, and an outer circumferential surface of the workpiece W faces the radially inside surfaces 59a of the workpiece gripping claws 59.

In this step S2, the controller 12 operates the robot 14 on the basis of the information of the reference point of the workpiece gripping claws 59 with respect to the wrist 22 pre-stored in the memory, and of the position and the orientation of the workpiece W acquired in step S1, and positions the robot hand 50 with respect to the workpiece W to be gripped such that a portion of the workpiece W is between the workpiece gripping claws 59.

In step S3, the controller 12 arranges the movement restricting claws 75 in the disengaged position. Specifically, the controller 12 sends a command to the first drive section 72, and moves the movement restricting claws 75 in the direction away from the axis $O_1$. As a result, the movement restricting claws 75 are disposed at the disengaged position in which the projections 78 are disengaged from the holes 84.

In step S4, the controller 12 closes the workpiece gripping claws 59 to grip the workpiece W. Specifically, the controller 12 sends a command to the second drive section 74 so as to move each of the workpiece gripping claws 59 in the direction toward the axis $O_2$. As a result, the workpiece W is gripped by the workpiece gripping claws 59. At this time, the center axis of the workpiece W gripped by the workpiece gripping claws 59 substantially coincides with the axis $O_2$ of the second hand section 53.

The movement restricting claws 75 are disposed at the disengaged position at this time, and thus the second hand section 53 can be displaced with respect to the first hand section 52 by the action of the elastic member 56. Therefore, when a force is applied to the second hand section 53 when the workpiece gripping claws 59 grips the workpiece W in this step S4, the second hand section 53 can be flexibly displaced in accordance with the applied force.

According to this configuration, it is possible to prevent damage to other workpieces W than the workpiece W to be gripped when gripping the workpiece W to be gripped by the workpiece gripping claws 59. This effect is more specifically described below.

When the workpiece gripping claws 59 is closed to grip the workpiece W to be gripped, the workpiece W to be gripped may move to contact other workpieces W. In this case, a reaction force is applied to the gripped workpiece W from the other workpieces W, and the second hand section 53 is displaced in accordance with this reaction force. By this action, since the force applied to the other workpieces W from the gripped workpiece W can be reduced, it is possible to prevent damage to the other workpieces W.

Further, since the reaction force applied from the other workpieces W when gripping the workpiece W to be gripped can be absorbed by the elastic member 56, it is possible to prevent excessive force from being applied to the first hand section 52 and the second hand section 53. As a result, a longer service life of the robot hand 50 can be achieved.

In step S5, the controller 12 retracts the robot hand 50. Specifically, the controller 12 operates the robot 14 so as to move the robot hand 50 upward to retract it from the container C.

At this time, the movement restricting claws 75 are continuously disposed at the disengaged position. Thus, when the workpiece W gripped by the retracting robot hand 50 retracting in this this step S5 comes into contact with the other workpieces W, by which a reaction force is applied to the workpiece gripping claws 59, the second hand section 53 can be flexibly displaced in accordance with the reaction force.

According to this configuration, it is possible to prevent the other workpieces W from being damaged by the operation of retracting the robot hand 50 gripping the workpiece W to be gripped. Further, since the reaction force applied from the other workpieces W is absorbed by the elastic member 56, a longer service life of the robot hand 50 can be achieved.

In step S6, the controller 12 arranges the movement restricting claws 75 at the engaged position. Specifically, the controller 12 sends a command to the first drive section 72 so as to move the movement restricting claws 75 in the direction toward the axis $O_1$.

Due to this, the projections 78 of the movement restricting claws 75 are inserted into the corresponding holes 84, and thus the movement restricting claws 75 are disposed at the engaged position. In this way, the rotation movement about the axis $O_1$ and the translation movement in the direction of the axis $O_1$ and the direction intersecting the axis $O_1$ of the second hand section 53 with respect to the first hand section 52 are restricted.

In this regard, when a force is applied to the second hand section 53 so as to displace the second hand section 53 with respect to the first hand section 52 during execution of the above-described steps S4 and S5, the second hand section 53 moves toward the initial position by an elastic restoration of the elastic member 56.

Nevertheless, even when the elastic member 56 is elastically restored, the second hand section 53 cannot return completely to the initial position, as a result, the second hand section 53 may be displaced from the initial position with respect to the first hand section 52.

For example, the second hand section 53 may perform the translation movement with respect to the first hand section 52 so as to displace from the initial position in the radial direction, as a result of which, the axis $O_2$ of the second hand section 53 may be inclined with respect to the axis $O_1$ of the first hand section 52. Alternatively, the second hand section 53 may perform the rotation movement with respect to the first hand section 52 so as to displace from the initial position in the circumferential direction.

Figure 7:
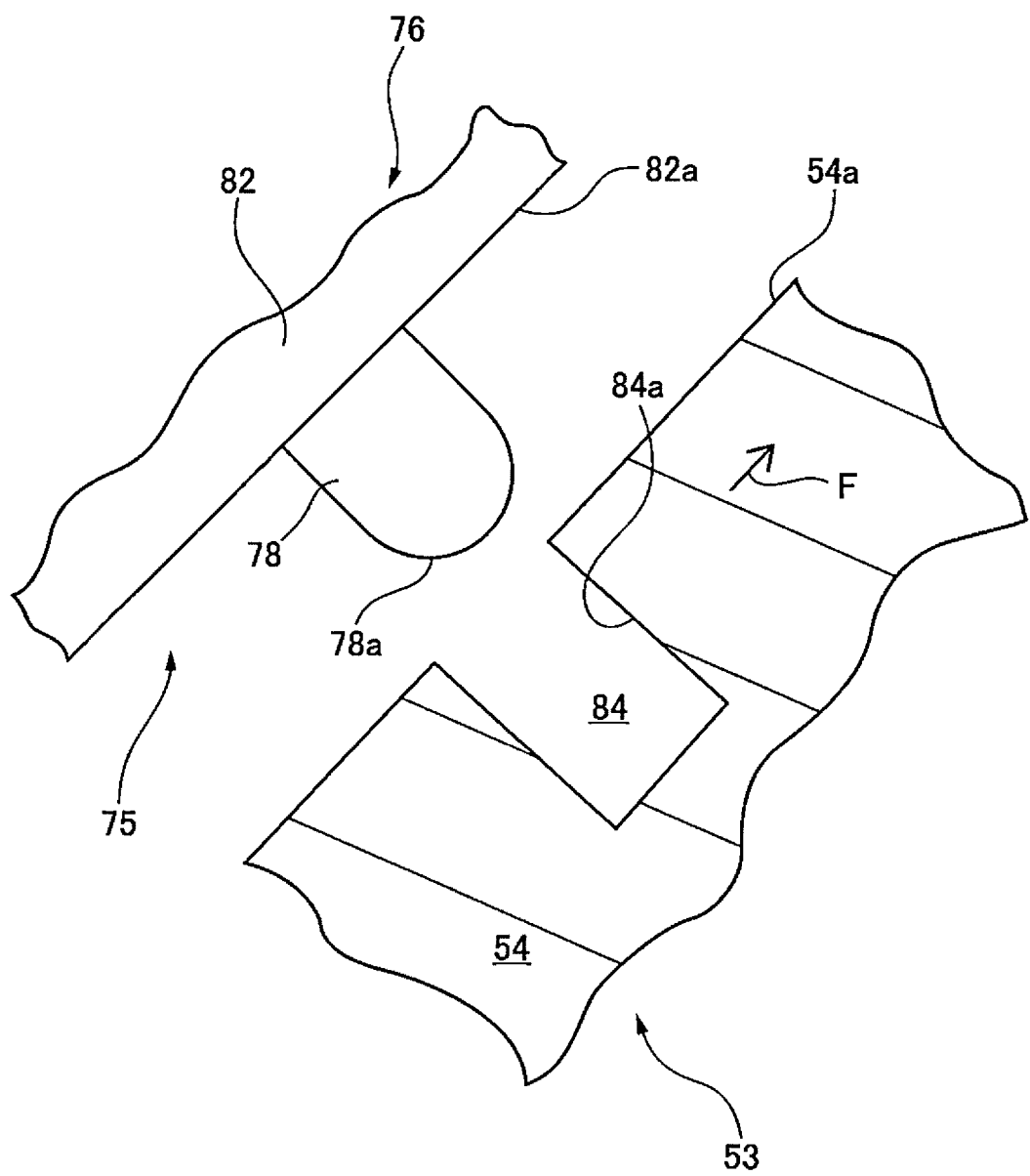
FIG. 7 illustrates a state when a position of a projection of a movement restricting claw has deviated from a position of a corresponding hole.

FIG. 7 schematically shows a state where the second hand section 53 is displaced from the initial position. In the state illustrated in FIG. 7, the position of each projection 78 is displaced from the position of the corresponding hole 84.

When the movement restricting claws 75 each move toward the axis $O_1$ in such a state at step S6, a side wall face 84a defining the hole 84 is pressed by the projection 78 in a direction indicated by an arrow F in FIG. 7 as the tapered part 78a formed at the projection 78 slides into the hole 84.

Figure 8:
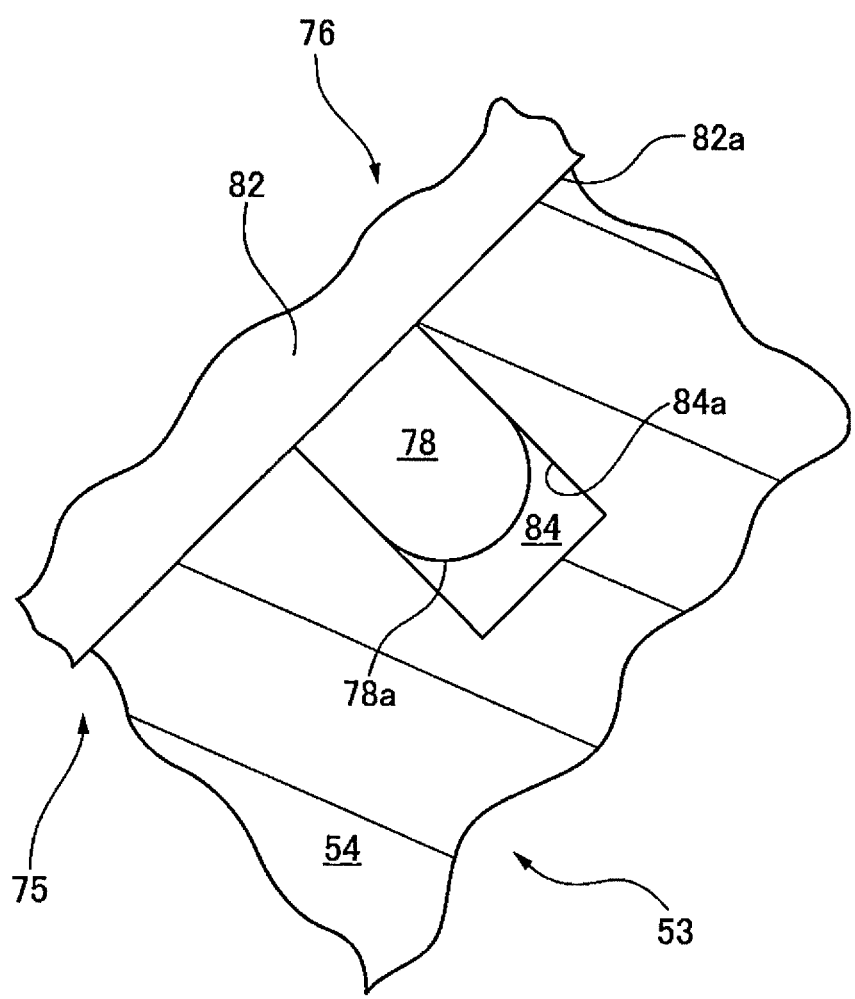
FIG. 8 illustrates a state when the second hand section has returned to an initial position by a function of a position returning mechanism.

As a result, the second hand section 53 moves in the direction of the arrow F by the projections 78, the movement restricting claws 75 are disposed at the engaged position in which the projections 78 are inserted into the holes 84 as illustrated in FIG. 8, and the second hand section 53 returns to the initial position with respect to the first hand section 52.

In this way, in the present embodiment, the second hand section 53 is returned from the position illustrated in FIG. 7 to the initial position illustrated in FIG. 8 by inserting the projections 78 formed with the tapered sections 78a into the holes 84.

Thus, in the present embodiment, the projections 78 formed with the tapered sections 78a and the first drive section 72 that drives the projections 78 function as a position returning mechanism configured to return the position of the second hand section 53 to the initial position. That is, the movement restricting mechanism 60 according to the present embodiment also functions as the position returning mechanism.

A maximum value of a return amount by which the position of the second hand section 53 is returned by the position returning mechanism in the present embodiment substantially equal to a radius of the projection 78 and the hole 84. In other words, a position return amount of the second hand section 53 by the position returning mechanism can be suitably adjusted by the radius of the projection 78 and the hole 84.

Note that, in the present embodiment, the first hand section 52, the second hand section 53, and the workpiece gripping claws 59 are configured such that the center axis of the workpiece W gripped by the workpiece gripping claws 59 substantially coincides with the axes $O_1$ and $O_2$ of the robot hand 50 when the second hand section 53 is disposed at the initial position.

Figure 9:
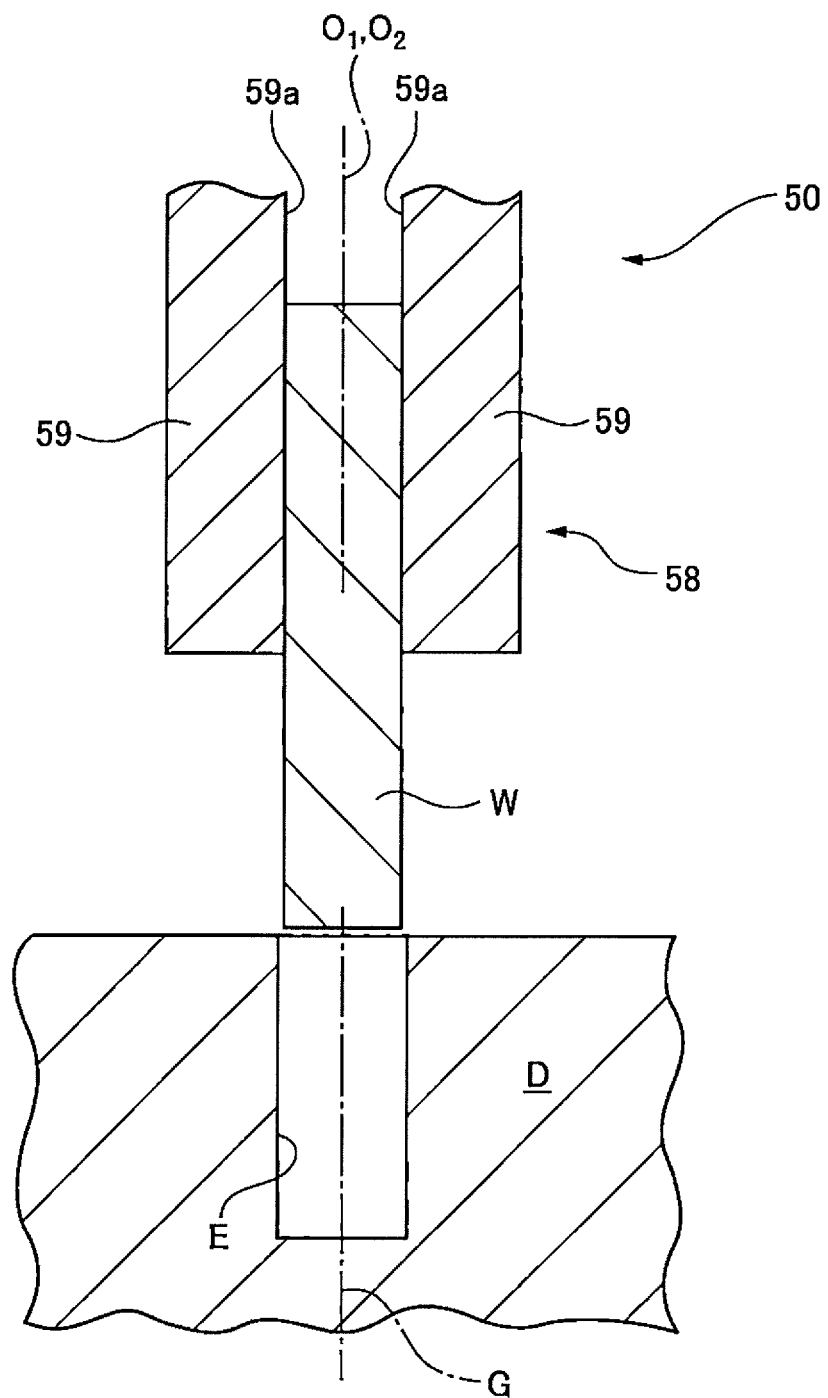
FIG. 9 illustrates a state when step S7 in FIG. 4 has ended.

In step S7, the controller 12 positions the robot hand 50 such that a lower end of the workpiece W gripped by the robot hand 50 is positioned just above the mounting hole E formed in the workpiece mounting member D. FIG. 9 illustrates an example of a state when the lower end of the workpiece W is disposed just above the mounting hole E. At this time, the axes $O_1$ and $O_2$ of the robot hand 50 (i.e., the center axis of the workpiece W) and an axis G of the mounting hole E substantially coincide with each other.

As an example, the workpiece mounting member D is disposed at a predetermined position in the robot coordinate system $C_R$, and the position (coordinates on the x-y plane) of the axis G of the mounting hole E in the robot coordinate system $C_R$ is known. The memory of the controller 12 pre-stores the position of the axis G in the robot coordinate system $C_R$. In this case, the controller 12 reads out from the memory the position of the axis G in the robot coordinate system $C_R$, and acquires the position of the axis G.

As another example, the vision sensor 15 images the workpiece mounting member D before step S7, and analyzes the captured image to calculate the position of the axis G of the mounting hole E in the robot coordinate system $C_R$. In this case, the controller 12 acquires the position of the axis G in the robot coordinate system $C_R$ from the vision sensor 15.

In this step S7, the controller 12 operates the robot 14 based on the information of the reference point of the workpiece gripping claws 59 with respect to the wrist 22 and on the position of the axis G in the robot coordinate system $C_R$ acquired from the vision sensor 15 or the memory, and positions the robot hand 50 with respect to the mounting hole E such that the lower end of the workpiece W is positioned just above the mounting hole E.

In step S8, the controller 12 carries out an operation of rotating and inserting the workpiece W into the mounting hole E. In this regard, when the circular columnar shaped workpiece W is inserted into the circular mounting hole E, the workpiece W may be more effectively inserted into the mounting hole E by inserting the workpiece W into the mounting hole E along with rotating the workpiece W than simply inserting the workpiece W into the mounting hole E (e.g., when the dimensions of the workpiece W and the mounting hole E are substantially the same and friction between the workpiece W and the wall face defining the mounting hole E is significantly large).

In view of this, the robot system 10 according to the present embodiment carries out this step S8. Specifically, the controller 12 operates the robot 14 to move the robot hand 50 downward concurrently with rotating the robot hand 50 about the axis $O_1$. Thus, the workpiece W gripped by the robot hand 50 is inserted into the mounting hole E along with rotation about the axis $O_1$.

At the start of this step S8, since the movement restricting claws 75 are disposed at the engaged position (step S6), the rotation movement about the axis $O_1$ of the second hand section 53 is restricted. Accordingly, since the second hand section 53 is prevented from displacing in the circumferential direction with respect to the first hand section 52, it is possible to effectively rotate and insert the workpiece W gripped by the robot hand 50 into the mounting hole E in this step S8.

In step S9, the controller 12 opens the workpiece gripping claws 59. Specifically, the controller 12 sends a command to the second drive section 74, and moves each of the workpiece gripping claws 59 in the direction away from the axis $O_2$. As a result, the workpiece gripping claws 59 release the workpiece W.

In step S10, the controller 12 determines whether the works of inserting all workpieces W in the container C into the mounting holes E has been completed. When the controller 12 determines that all works have been completed (i.e., determines YES), the flow illustrated in FIG. 4 is ended. On the other hand, when the controller 12 determines that the any workpiece W to be inserted into the mounting holes E remains in the container C (i.e., determines NO), the flow returns to step S1.

As described above, in the present embodiment, the movement restricting mechanism 60 releasably restricts the rotation movement of the second hand section 53 with respect to the first hand section 52. According to this configuration, it is possible to carry out a work such as rotating and inserting the workpiece W into the mounting hole E, while preventing damage to the workpiece W and lengthening the service life of the robot hand 50 as described above.

Further, in the prior art, in a robot system configured to rotate and insert the workpiece W gripped by the robot hand into the mounting hole E, the robot system carries out such a work while monitoring the force applied to the robot hand using a force sensor. According to the present embodiment, it is possible to constitute the robot system 10 capable of rotating and inserting the workpiece W into the mounting hole E without a force sensor. Thus, a manufacturing cost of the robot system 10 can be reduced.

Further, in the present embodiment, the movement restricting mechanism 60 includes the movement restricting claws 75, and the first drive section 72 that drives the movement restricting claws 75 between the engaged position and the disengaged position. According to this configuration, the movement restricting claws 75 can be moved at high speed with high precision between the engaged position and the disengaged position.

Further, in the present embodiment, the movement restricting mechanism 60 includes the plurality of movement restricting claws 75. According to this configuration, the rotation movement of the second hand section 53 with respect to the first hand section 52 can be firmly restricted by the plurality of movement restricting claws 75. Further, the movement restricting mechanism 60 can position the second hand section 53 in the initial position with high precision and in a stable manner when functioning as the position returning mechanism.

Further, in the present embodiment, the movement restricting claws 75 include the projections 78 receivable in the holes 84. According to this configuration, since the restriction of the movement of the second hand section 53 with respect to the first hand section 52 can be achieved by a simpler structure, it is possible to reduce the manufacturing cost.

Further, in the present embodiment, the movement restricting claws 75 further restrict the translation movement of the second hand section 53 with respect to the first hand section 52 by the projections 78 engaging the holes 84. According to this configuration, since the robot hand 50 can grip the workpiece W so as to be immovable in the six-axis directions during the execution of step S8, it is possible to carry out the operation of positioning the workpiece W, and rotating and inserting it into the mounting hole E, with the same level of precision as a rigid robot hand not including the elastic member 56.

Further, in the present embodiment, the robot hand 50 includes the position returning mechanism (the movement restricting mechanism 60 functions as well) that returns the second hand section 53 to the initial position when the position of the second hand section 53 displaces from the initial position.

According to this configuration, even when the position of the second hand section 53 displaces from the initial position (e.g., the axis $O_1$ has inclined with respect to the axis $O_2$) in step S4 or S5, the second hand section 53 can be returned to the initial position, and the controller 12 can accurately recognize the gripping position (i.e., the reference point of the workpiece gripping claws 59) of the robot hand 50.

Due to this, the controller 12 can execute a work that requires precision, such as aligning the center axis of the workpiece W gripped by the robot hand 50 with the axis G of the mounting hole E (step S7).

Note that, in the above described step S8, the controller 12 may repeatedly execute an operation of moving the robot hand 50 downward concurrently with rotating the robot hand 50 about the axis $O_1$, and stopping the operation.

Specifically, the controller 12 carries out rotating and inserting the workpiece W into the mounting hole E over a predetermined time period $T_1$, and then, stops the operation over a predetermined time period $T_2$. This rotating and inserting operation and the stop thereof may be repeatedly executed at a cycle $\tau$ ($=T_1+T_2$).

Further, the controller 12 may arrange the movement restricting claws 75 in the disengaged position similar to step S3 at the start of the above-described time period $T_2$, and then arrange the movement restricting claws 75 in the engaged position similar to step S6 at the start of the time period $T_1$.

According to this configuration, even when the workpiece W bites into the wall face of the mounting hole E in the time period $T_1$, in the period $T_2$, the second hand section 53 can be displaced in accordance with the reaction force that the workpiece W receives from the wall face of the mounting hole E, so as to cancel the biting by the action of the elastic member 56. Thus, it is possible to effectively prevent the excessive force from applying to the robot hand 50, and continue the work of rotating and inserting the workpiece W into the mounting hole E.

Note that the robot system 10 described above can also be applied to an application in which the workpiece W is simply inserted into the mounting hole E without rotation. In this case, the controller 12 may omit the above-described step S6, and execute step S7 with the movement restricting claws 75 being disposed at the disengaged position.

Then, the controller 12 may insert the workpiece W into the mounting hole E without rotation in step S8, in a state where the movement restricting claws 75 are disposed at the disengaged position. Such a flow can be carried out if the positional precision that is required for positioning the workpiece W to the mounting hole E is not so high (for example, if the mounting hole E has a significantly larger diameter than the workpiece W). In this case, it is possible to prevent the workpiece W or the workpiece mounting member D from being damaged when the workpiece W is inserted into the mounting hole E.

Figure 10:
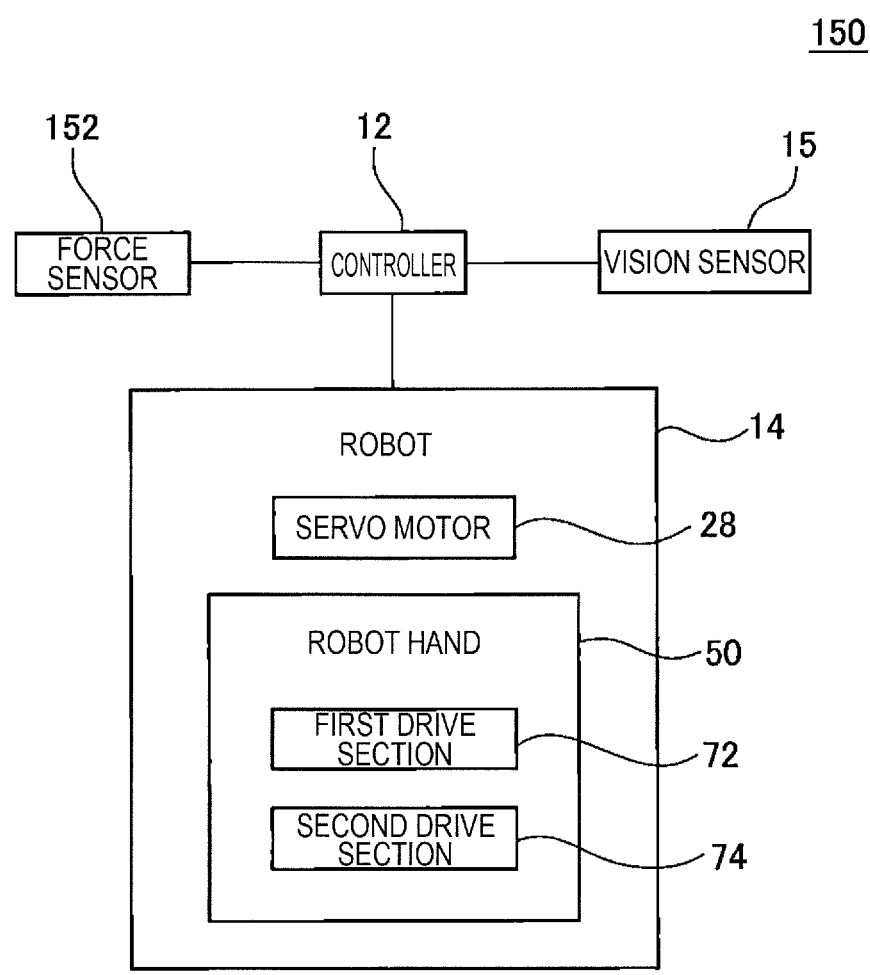
FIG. 10 is a block diagram of a robot system according to another embodiment.

Next, a robot system 150 according to another embodiment will be described with reference to FIG. 1 and FIG. 10. The robot system 150 differs from the above-described robot system 10 in that it further includes a force sensor 152.

The force sensor 152 is e.g. a six-axis force sensor, is attached to the robot 14, and detects a force applied to the robot 14. In the present embodiment, the force sensor 152 is built in the wrist 22, and detects the force applied to the robot hand 50.

The force sensor 152 sends data of the detected force to the controller 12. The force sensor 152 is not limited to the six-axis force sensor, but a sensor of any type that can detect the force applied to the robot 14 may be applied.

Next, the operation of the robot system 150 will be described with reference to FIG. 11. Note that, in the flow illustrated in FIG. 11, processes similar to those of the flow illustrated in FIG. 4 are assigned the same step number, and redundant descriptions thereof will be omitted.

In step S5', the controller 12 retracts the robot hand 50 gripping the workpiece W. In the present embodiment, the controller 12 retracts the robot hand 50 from the container C, and then moves the robot hand 50 to a position where the workpiece W gripped by the robot hand 50 is close to the mounting hole E of the workpiece mounting member D.

Specifically, the controller 12 operates the robot 14 so as to move the robot hand 50 upward to retract it from the container C. Then, the controller 12 operates the robot 14 so as to move the robot hand 50 to a position where the lower end of the workpiece W gripped by the robot hand 50 is close to the mounting hole E.

As an example, the memory of the controller 12 pre-stores the position (coordinates on the x-y plane) of the axis G of the mounting hole E in the robot coordinate system $C_R$. As another example, the vision sensor 15 images the workpiece mounting member D, and analyzes the captured image to calculate the position of the axis G of the mounting hole E in the robot coordinate system $C_R$, before step S5'.

The controller 12 operates the robot 14 based on the information of the above-described reference point of the workpiece gripping claws 59 and on the position of the axis G in the robot coordinate system $C_R$, which are acquired from the vision sensor 15 or the memory, and moves the robot hand 50 to a position where the lower end of the workpiece W gripped by the robot hand 50 is close to the mounting hole E.

Upon execution of this step S5', the movement restricting claws 75 are disposed at the disengaged position (step S3). Accordingly, the position of the second hand section 53 with respect to the first hand section 52 may be displaced from the initial position. Nevertheless, the operation of bringing the lower end of the workpiece W close to the mounting hole E does not require high precision as in the above-described step S7, and therefore, this step S5' can be executed even when the movement restricting claws 75 is disposed at the disengaged position.

Further, when the workpiece W collides with the workpiece mounting member D and a reaction force is applied to the workpiece gripping claws 59 when the robot hand 50 is moved in this step S5', the second hand section 53 can be flexibly displaced in accordance with the reaction force by the action of the elastic member 56.

Thus, even when the workpiece W collides with the workpiece mounting member D, it is possible to prevent the force sensor 152 from being broken due to the reaction force, and reduce the possibility of damage to the workpiece W and the workpiece mounting member D.

As a result, in the present embodiment, the robot hand 50 can be moved at high speed in this step S5', compared to a case where the workpiece gripping claws 59 are fixed to the wrist (for example, a case where the second hand section 53 is fixed to the first hand section 52 without the elastic member 56, or where the movement restricting claws 75 are disposed at the engaged position). Accordingly, the cycle time of the work can be reduced.

In step S8', the controller 12 carries rotating and inserting the workpiece W into the mounting hole E. This step S8' will be described with reference to FIG. 12. Note that, in the flow illustrated in FIG. 12, processes similar to those of the flow illustrated in FIG. 4 are assigned the same step number, and redundant descriptions thereof will be omitted.

In step S21, the controller 12 starts to detect a force applied to the robot 14. Specifically, the controller 12 starts to receive from the force sensor 152 data of a force detected by the force sensor 152 periodically (e.g., every 0.5 seconds).

In step S22, the controller 12 operates the robot 14 so as to move the robot hand 50 downward concurrently with rotating the robot hand 50 about the axis $O_1$. Thus, the workpiece W gripped by the robot hand 50 is inserted into the mounting hole E while being rotated about the axis $O_1$.

In step S23, the controller 12 determines whether a force F most-recently received from the force sensor 152 is greater than a predetermined threshold value α. This threshold value α is predetermined as a value for the force F, and is pre-stored in the memory of the controller 12.

For example, the threshold value α is determined as a value of the force applied to the force sensor 152 when the workpiece W bites into the wall face of the mounting hole E so as to prevent the rotational movement of the workpiece W during execution of step S22. This threshold value α can be obtained by an experimental technique, a simulation, or the like.

The controller 12 determines YES when the force F is greater than the threshold value α (i.e., F>α), and proceeds to step S26. On the other hand, the controller 12 determines NO when the force F is equal to or less than the threshold value α (i.e., F≤α), and proceeds to step S24.

In step S24, the controller 12 determines whether the robot hand 50 has reached a target position. For example, the controller 12 determines that the robot hand 50 has reached the target position (i.e., determines YES) when the robot hand 50 has moved downward by a predetermined distance from the start of step S22. The controller 12 proceeds to step S25 when it determines YES, while the controller 12 returns to step S23 when it determines NO.

In step S25, the controller 12 stops the robot 14. Thus, the movement of the robot hand 50 is stopped, and the workpiece W is inserted into the mounting hole E. Then, the controller 12 ends the flow illustrated in FIG. 12, and proceeds to step S9 in FIG. 11.

On the other hand, when the controller 12 determines YES in step S23, in step S26, the controller 12 stops the robot 14, whereby the movement of the robot hand 50 is stopped, similar to the above-described step S25.

Then, the controller 12 carries out the above-described step S3 so as to arrange the movement restricting claws 75 in the disengaged position. In this connection, when it is determined YES in step S23, there is a high possibility that the workpiece W bites into the wall face of the mounting hole E during execution of step S22 such that the rotational movement of the workpiece W is prevented.

If the movement restricting claws 75 are arranged in the disengaged position so as to allow the displacement of the second hand section 53 by the action of the elastic member 56 when the workpiece W bites into the wall face of the mounting hole E as stated above, the second hand section 53 can slightly rotates in reverse in the direction opposite the rotational direction in step S22, as a result of which, it is possible to eliminate the biting of the workpiece W into the wall face.

Then, the controller 12 executes the above-described step S6 so as to arrange the movement restricting claws 75 in the engaged position again. Then, the controller 12 returns to step S22.

According to the present embodiment, even when the workpiece W bites into the wall face of the mounting hole E and the rotational movement of the workpiece W is prevented during execution of step S22, it is possible to prevent excessive force from being applied to the robot hand 50. As a result, it is possible to prevent the force sensor 152 from being broken.

Further, the biting of the workpiece W into the wall face of the mounting hole E can be automatically eliminated by arranging the movement restricting claws 75 in the disengaged position after it is determined YES in step S23, and therefore it is not necessary to operate the robot 14 so as to rotate the robot hand 50 in reverse. Thus, the cycle time of work can be reduced.

Next, a robot hand 90 according to another embodiment will be described with reference to FIG. 13 and FIG. 14. The robot hand 90 is attachable to the wrist 22 of the robot 14, instead of the above-described robot hand 50.

The robot hand 90 includes a first hand section 92, a second hand section 94, an elastic member 96, and a movement restricting mechanism 98. The first hand section 92 is a circular-column shape having the axis $O_1$, and includes the mounting section 62 and a main body 100.

The second hand section 94 is connected to the first hand section 92 via the elastic member 96. The second hand section 94 includes a main body 95 and the workpiece gripping section 58 provided at the main body 95. The main body 95 is a circular-column shaped hollow member having the axis $O_2$, and includes the second drive section 74 therein.

A hole 102 is formed at an axially rear end face 95a of the main body 95 so as to be recessed from the end face 95a. As illustrated in FIG. 14, the hole 102 has a substantially rectangular outer shape as viewed from the axial direction, and is configured to receive a movement restricting claw 104 described later. In the present embodiment, the hole 102 is arranged such that the axis $O_2$ is at the center of the hole 102.

The elastic member 96 is a cylindrical member, and connects the first hand section 92 and the second hand section 94 to each other in an elastically displaceable manner. Specifically, the elastic member 96 is connected at its axially rear end to an end face 100a of the main body 100 of the first hand section 92, while it is connected at its axially front end to the end face 95a of the second hand section 94.

The movement restricting mechanism 98 releasably restricts a rotation movement of the second hand section 94 about the axis $O_1$ (i.e., circumferential direction), which is elastically displaceable with respect to the first hand section 92. Specifically, the movement restricting mechanism 98 includes the movement restricting claw 104 and a first drive section 106.

Figure 14:
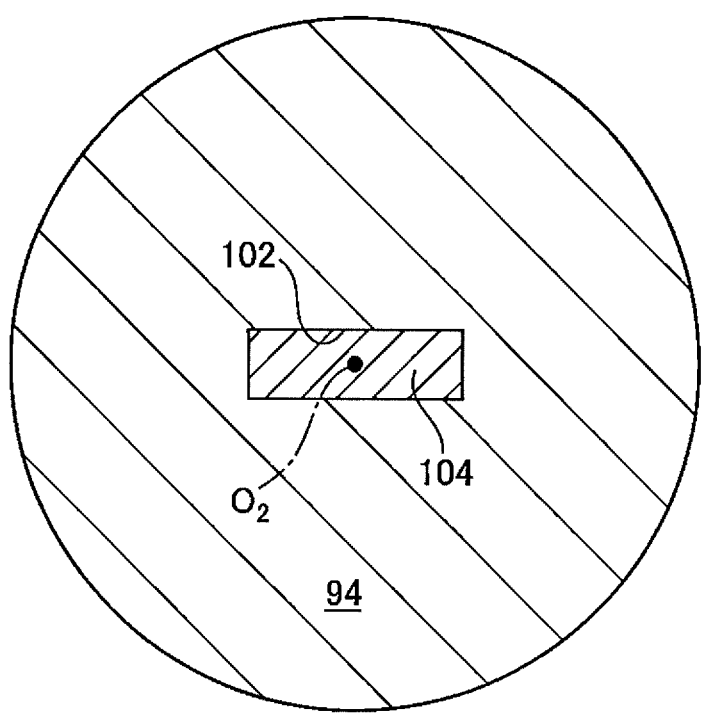
FIG. 14 is a cross-sectional view along XIV-XIV in FIG. 13.

As illustrated in FIG. 14, the movement restricting claw 104 has a substantially rectangular cross-sectional shape as viewed from the axial direction, and extends in the axial direction. The movement restricting claw 104 is arranged such that the axis $O_1$ is at the center of the movement restricting claw 104.

The movement restricting claw 104 is provided at the main body 100 of the first hand section 92 so as to be movable in the axial direction. The movement restricting claw is made from a material (e.g., steel) having higher rigidity than the first hand section 92 and the second hand section 94.

The first drive section 106 is fixed to the end face 100a of the first hand section 92, and advances and retracts the movement restricting claw 104 in the axial direction in accordance with a command from the controller 12. The first drive section 106 includes e.g. a servomotor or a cylinder.

Figure 13:
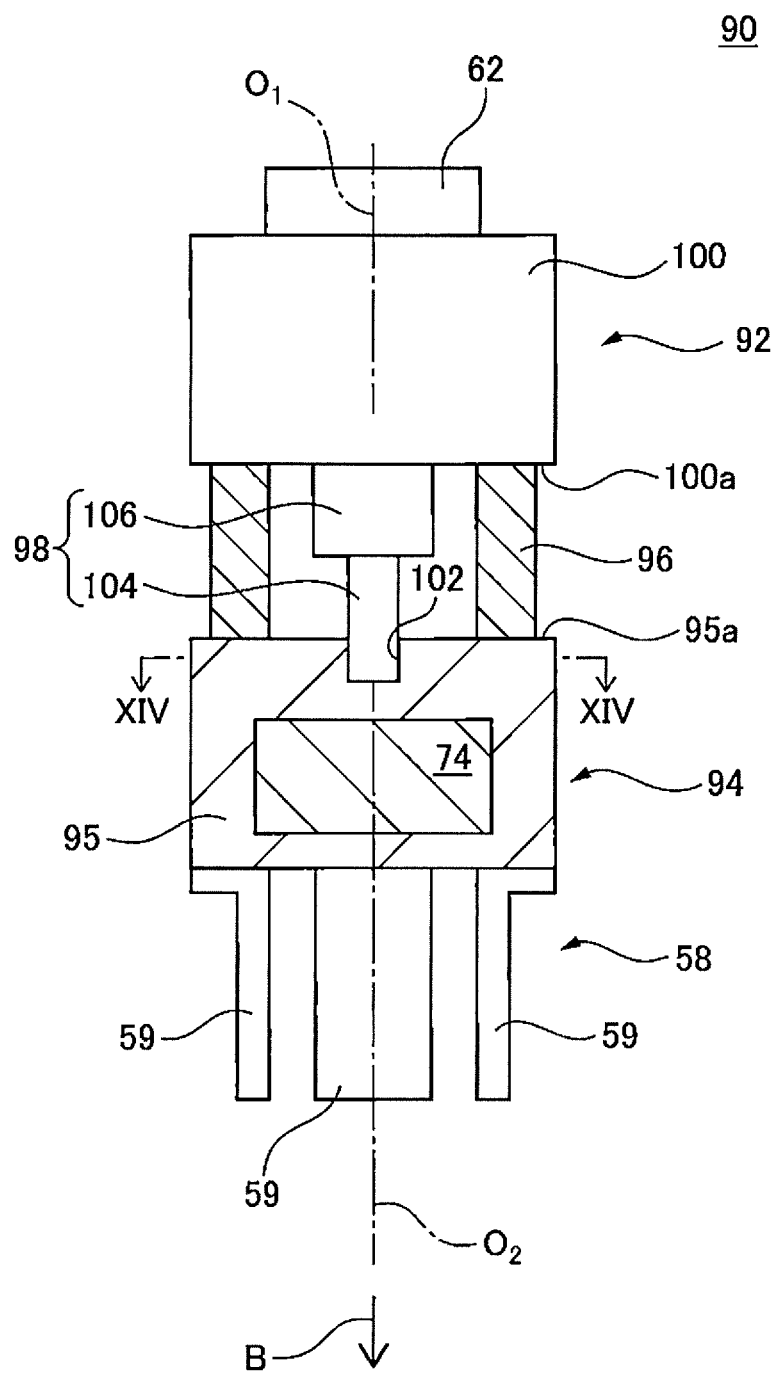
FIG. 13 is a partial cross-sectional view of a robot hand according to another embodiment, and illustrates a state when the movement restricting claw is disposed at an engaged position.

When the first drive section 106 advances the movement restricting claw 104 axially frontward, the movement restricting claw 104 is disposed at an engaged position illustrated in FIG. 13. When the movement restricting claw 104 is disposed at the engaged position, an axially front end of the movement restricting claw 104 is received in the hole 102 so as to engage a wall face defining the hole 102.

By this engagement, the rotation movement about the axis $O_1$ and the translation movement in the axially rearward direction and in a direction intersecting the axis $O_1$ (e.g., the radial direction) of the second hand section 94 with respect to the first hand section 92 are restricted.

Figure 15:
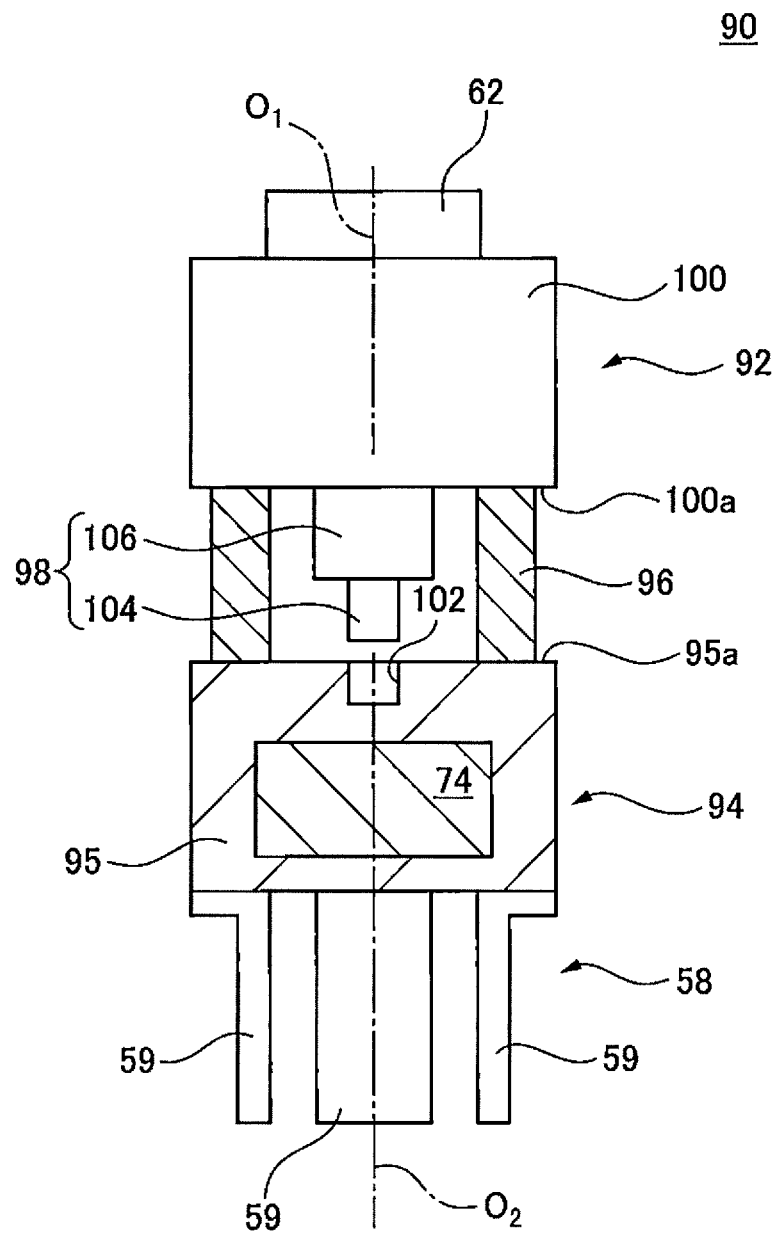
FIG. 15 illustrates a state when the movement restricting claw illustrated in FIG. 12 is disposed at a disengaged position.

On the other hand, when the first drive section 106 retracts the movement restricting claw 104 axially rearward, the movement restricting claw 104 is disposed at a disengaged position illustrated in FIG. 15. When the movement restricting claw 104 is disposed at the disengaged position, the movement restricting claw 104 is disengaged from the hole 102, and separated radially upward from the end face 95a of the second hand section 94.

When a force is applied to the second hand section 94 in this state, the elastic member 96 is elastically deformed, whereby the second hand section 94 can be displaced with respect to the first hand section 92 in accordance with the force.

Figure 11:
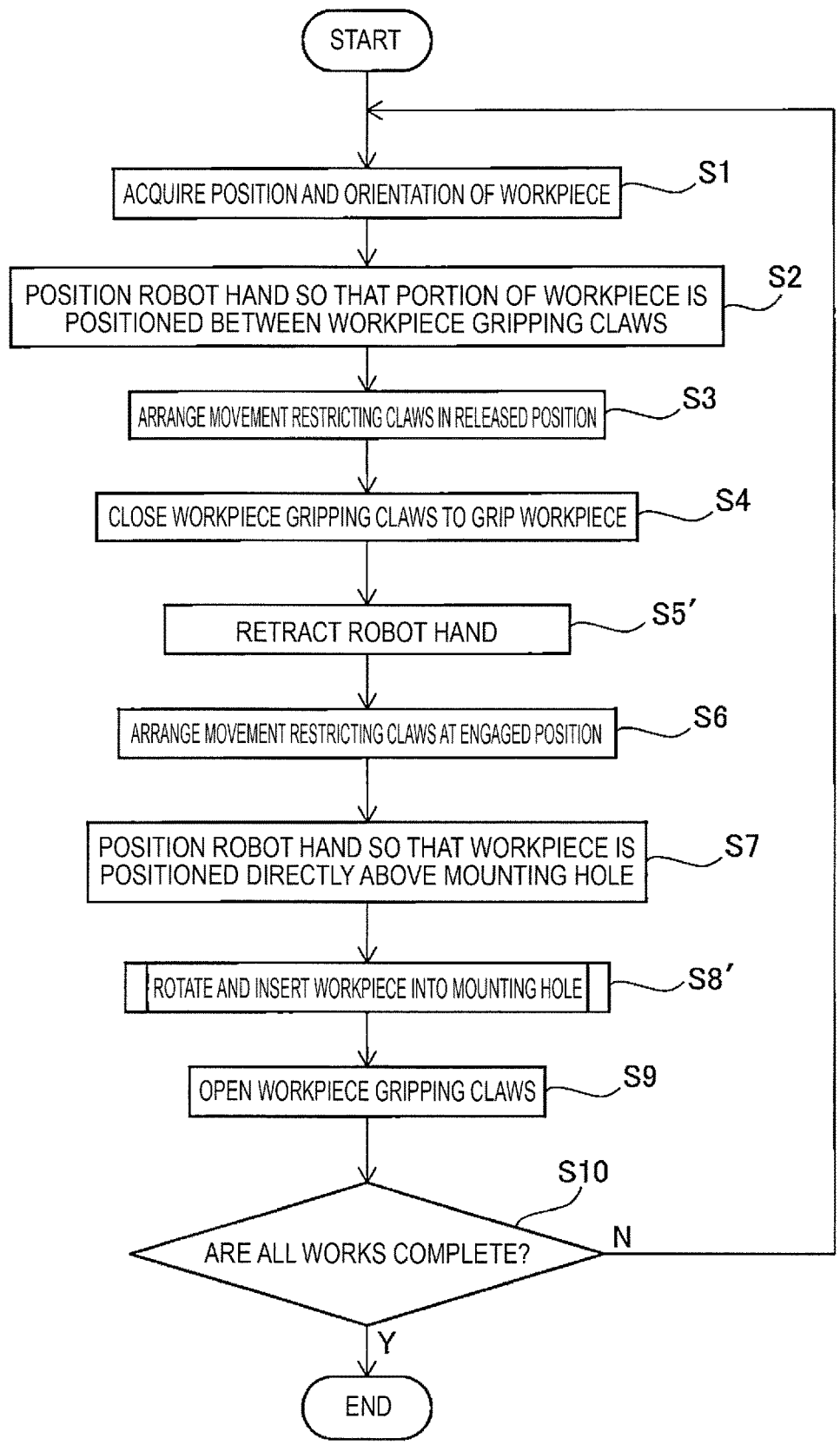
FIG. 11 is a flowchart illustrating an example of an operation flow of the robot system illustrated in FIG. 10.
Figure 12:
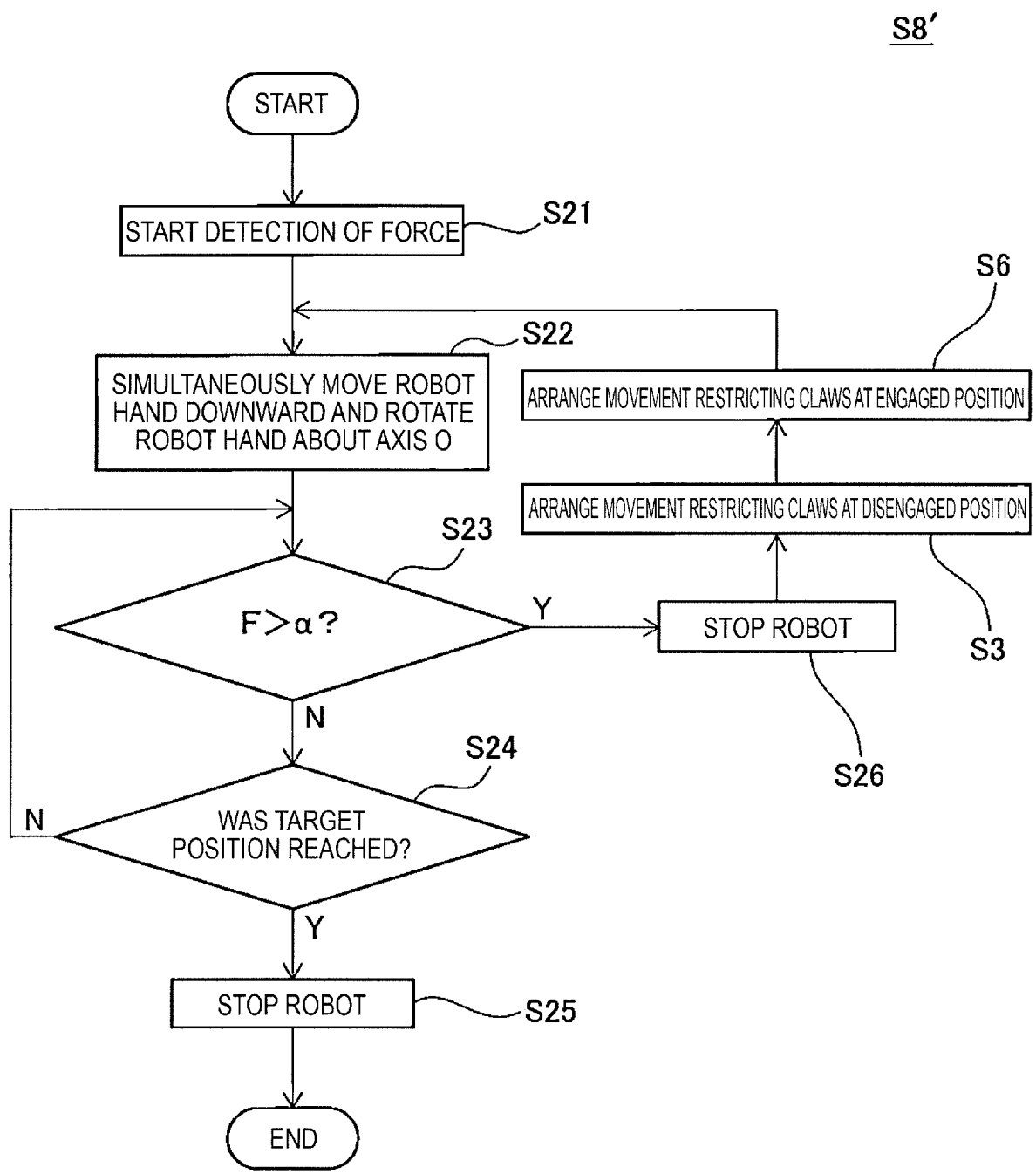
FIG. 12 is a flowchart illustrating an example of the flow of step S8' of FIG. 11.

When the robot hand 90 according to the present embodiment is applied to the above-described robot system 10 or 150, the controller 12 can carry out the work of gripping the workpiece W with the robot hand 90 and rotating and inserting the workpiece W into the mounting hole E of the workpiece mounting member D by executing the flow illustrated in FIG. 4, or FIGS. 11 and 12.

Note that the movement restricting claw 104 is not limited to a substantially rectangular cross-sectional shape, but may have an X-shaped cross section, or any cross-sectional shape capable of restricting the movement of the second hand section 94 in the direction about the axis $O_1$. In this case, the hole 102 is formed so as to have an outer shape corresponding to the movement restricting claw 104.

In the above-described embodiments, the rotation movement of the second hand section 53, 94 about the axis $O_1$ with respect to the first hand section 52, 102 is restricted by engaging the movement restricting claw 75, 104 with the second hand section 53, 94. However, the movement restricting mechanism may restrict the rotation movement about the axis $O_1$ of the second hand section with respect to the first hand section, using e.g. a magnetic force.

Figure 16:
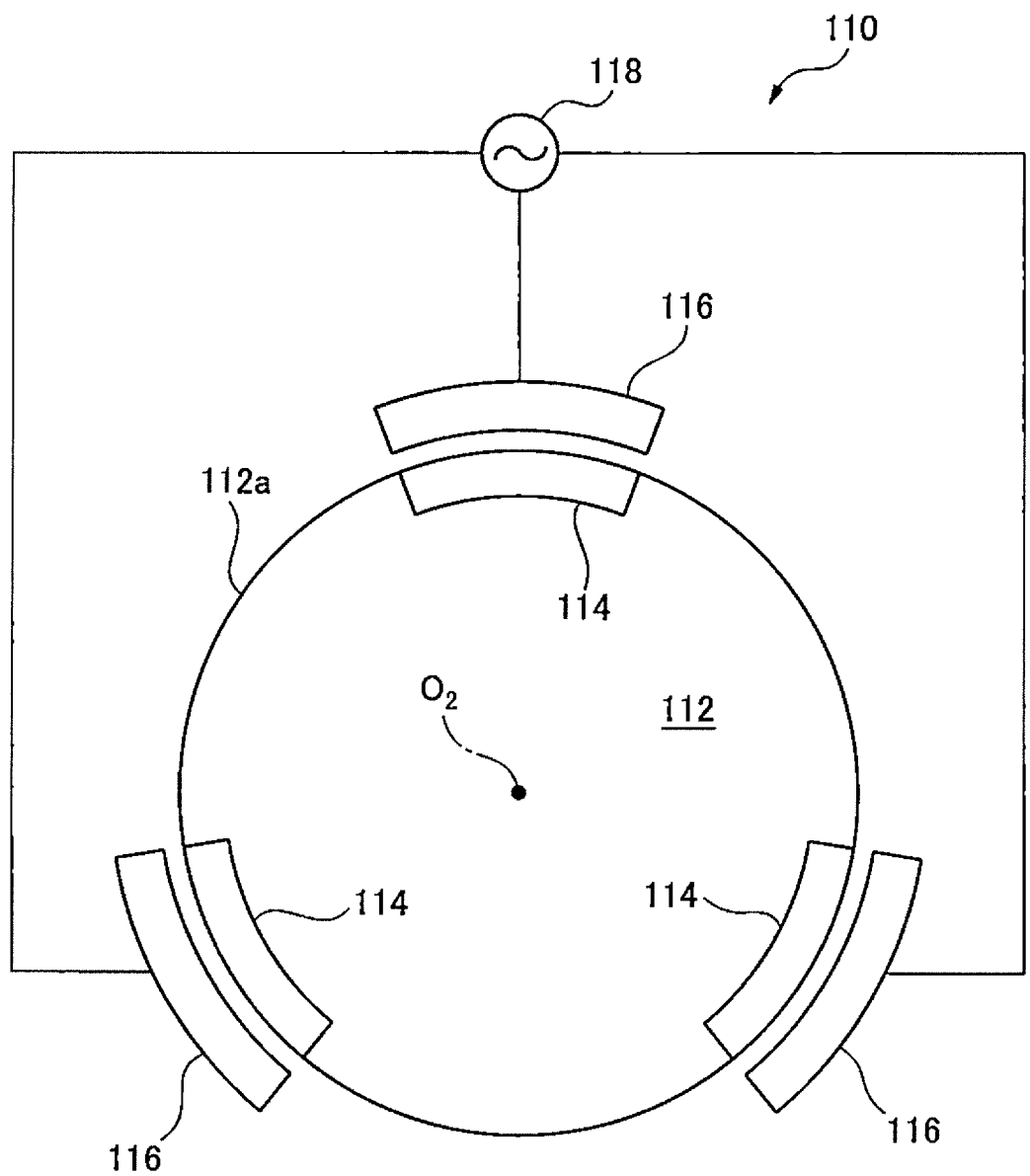
FIG. 16 illustrates a movement restricting mechanism according to another embodiment.

Such a movement restricting mechanism 110 is illustrated in FIG. 16. The movement restricting mechanism 110 includes a plurality of magnets 114, a plurality of electromagnets 116, and a power source 118. The magnets 114 are permanent magnets such as neodymium, and built in a second hand section 112.

The electromagnets 116 are disposed adjacent to an outer circumferential surface 112a of the second hand section 112 at radially outside of the outer circumferential surface 112a, so as to face the respective magnets 114. The electromagnets 116 are provided so as to be immovable with respect to the first hand section (not illustrated).

In the present embodiment, a total of three magnets 114 and a total of three electromagnets 116 are disposed so as to align in the circumferential direction at a substantially equal interval. The power source 118 magnetizes and demagnetizers the electromagnets 116 in accordance with a command from the controller 12.

When restricting the movement of the second hand section 112 by the movement restricting mechanism 110, the power source 118 magnetizes the electromagnets 116 so as to generate a magnetic force between the magnets 114 and the electromagnets 116 facing each other. The magnets 114 are attracted by the electromagnets 116 due to the thus-generated magnetic force, and whereby it is possible to restrict the movement of the second hand section 112 about the axis $O_1$.

On the other hand, when releasing the movement restriction of the second hand section 112, the power source 118 demagnetizes the electromagnets 116. As a result, the magnetic force between the magnets 114 and the electromagnets 116 is lost, and the second hand section 112 is displaceable with respect to the first hand section by the action of the elastic member (not illustrated).

Note that the movement restricting mechanism 110 according to the present embodiment also functions as a position returning mechanism that returns the position of the second hand section 112 to the initial position. Assuming that the second hand section 112 is displaced with respect to the first hand section when the movement restricting mechanism 110 allows the movement of the second hand section 112 (i.e., demagnetizes the electromagnets 116).

In this case, the magnets 114 provided at the second hand section 112 are displaces from the opposing electromagnets 116. When the power source 118 magnetizes the electromagnets 116 in this state, the magnets 114 are attracted by the electromagnets 116, and whereby the second hand section 112 is moved in the circumferential direction to the initial position in which the magnets 114 and the electromagnets 116 are aligned in the radial direction.

In this way, the magnets 114, the electromagnets 116, and the power source 118 also function as the position returning mechanism. Note that, in the present embodiment, the electromagnets 116 may be provided in the second hand section 112, while the magnets 114 are disposed radially outside of the outer circumferential surface 112a so as to face the electromagnets 116.

Note that the various features of the above-described embodiments may be combined. For example, the magnets 114, the electromagnets 116, and the power source 118 illustrated in FIG. 16 may be combined with the robot hand 90 illustrated in FIG. 13 to FIG. 15.

In this case, the magnets 114, the electromagnets 116, and the power source 118 may function as the position returning mechanism, while the rotation movement about the axis $O_1$ of the second hand section 94 may be restricted by the movement restricting mechanism 98. Thus, the robot hand 90 in this case includes the movement restricting mechanism 98, and the position returning mechanism comprised of the magnets 114, the electromagnets 116, and the power source 118.

Figure 3:
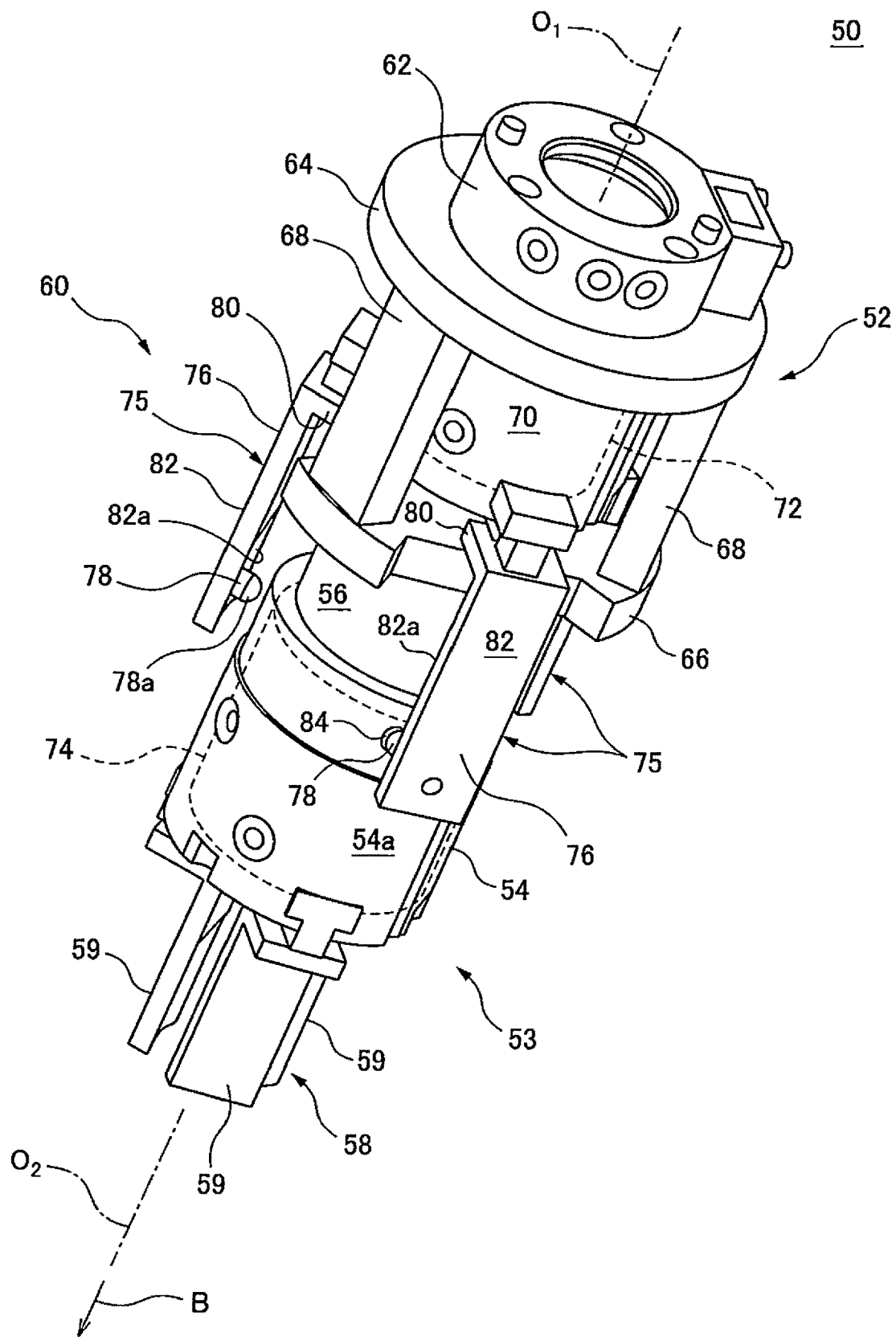
FIG. 3 is an enlarged view of a robot hand illustrated in FIG. 1.

Further, the magnets 114, the electromagnets 116, and the power source 118 illustrated in FIG. 16 may be combined with the robot hand 50 illustrated in FIG. 3. In this case, the tapered part 78a formed at the projection 78 may be omitted, and the magnets 114, the electromagnets 116, and the power source 118 may function as the position returning mechanism. Thus, the robot hand 50 in this case includes the movement restricting mechanism 60, and the position returning mechanism comprised of the magnets 114, the electromagnets 116, and the power source 118.

Further, the above-described first drive section 72 and second drive section 74 may be servomotors. Further, in the above-described robot hand 50, the arm 76 of the movement restricting claw 75 may be fixedly provided at the main body 70 of the first hand section 52, and the projection 78 may be provided at the arm 76 so as to advance and retract in the radial direction. In this case, the first drive section 72 drives the projection 78 between the engaged position in which the projection 78 is inserted into the hole 84, and the disengaged position in which the projection 78 is disengaged from the hole 84.

Figure 17:
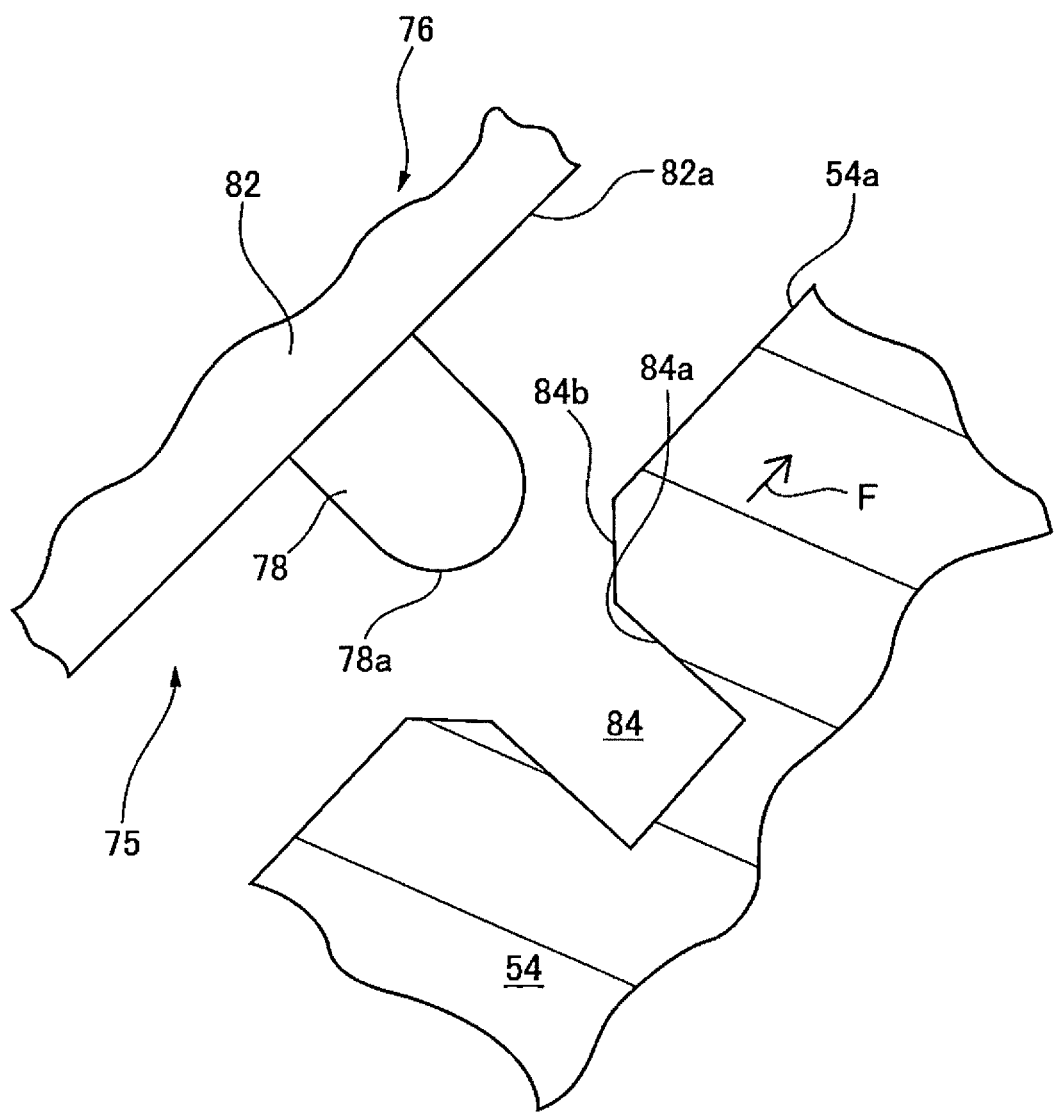
FIG. 17 is a drawing of a position returning mechanism according to another embodiment.

Further, a tapered part may be formed at the opening of the above-described hole 84. Such an embodiment is illustrated in FIG. 17. In the embodiment illustrated in FIG. 17, a tapered part 84b is formed at an opening end of the side wall face 84a defining the hole 84. This tapered part 84b is formed such that a cross-sectional area of the hole 84 increases as it approaches the outer circumferential surface 54*a*.

The tapered part 78*a* of the projection 78 is guided into the hole 84 by the tapered part 84*b*, and the second hand section 53 moves toward its initial position as the tapered part 78*a* slides into the hole 84.

Thus, in the present embodiment, the projection 78 formed with the tapered part 78*a*, the first drive section 72 that drives the projection 78, and the tapered part 84*b* function as the position returning mechanism. Due to this tapered part 84*b*, it is possible to increase the position return amount of the second hand section 53 by the position returning mechanism.

Figure 18:
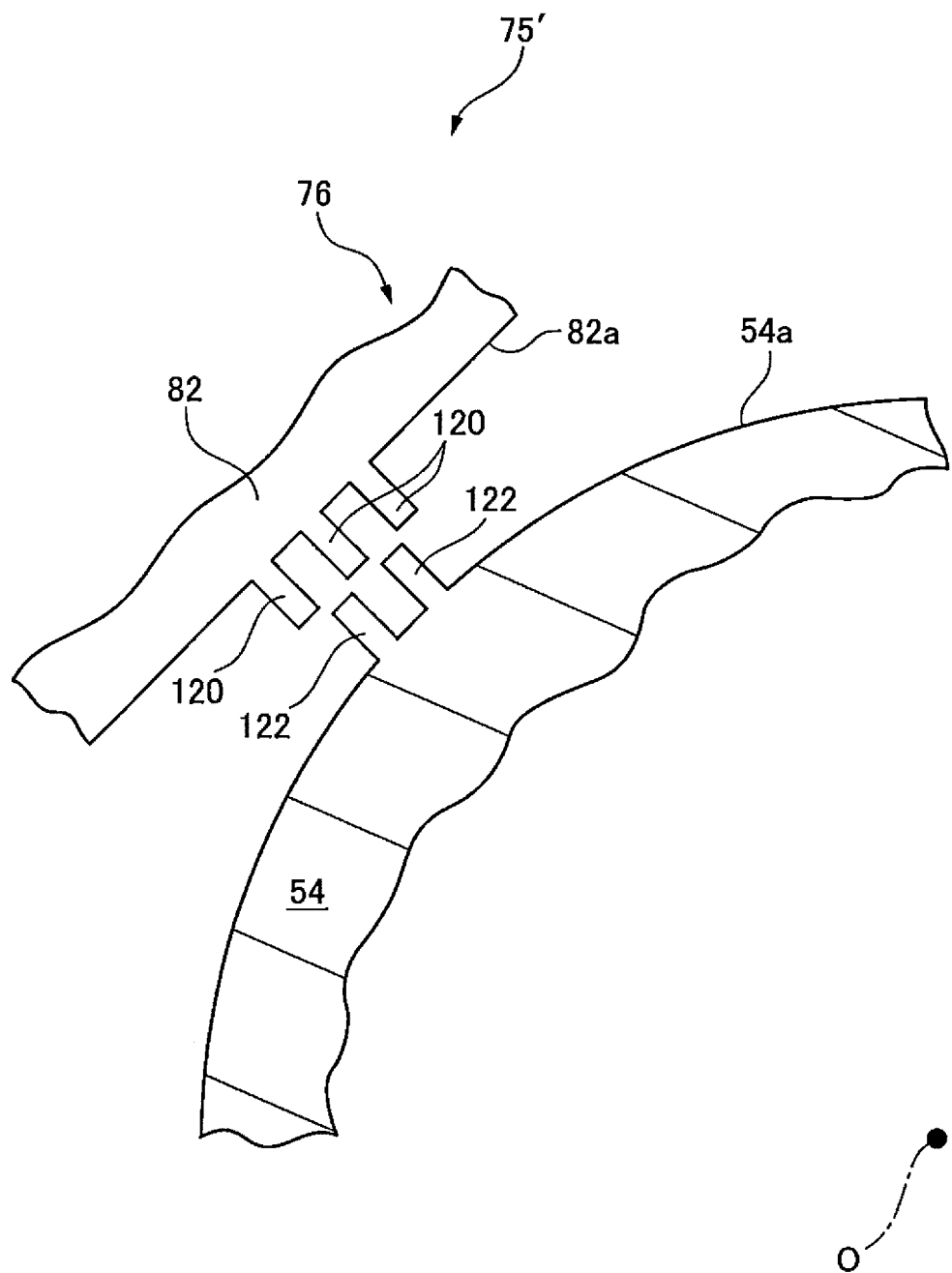
FIG. 18 is a drawing of a movement restricting mechanism according to another embodiment.

Note that, instead of the above-described projection 78 and hole 84, a plurality of teeth may be provided. Such an embodiment is illustrated in FIG. 18. In a movement restricting claw 75' illustrated in FIG. 18, a plurality of teeth 120 are formed on the surface 82*a* of the second section 82 of the arm 76 so as to protrude radially inward from the surface 82*a* and extend in the axial direction. These teeth 120 are disposed to align in the circumferential direction.

On the other hand, a plurality of teeth 122 are formed on the outer circumferential surface 54*a* of the second hand section 53 so as to protrude radially outward from the outer circumferential surface 54*a* and extend in the axial direction. These teeth 122 are disposed to align in the circumferential direction, and engageable with the teeth 120.

When the movement restricting claw 75' is disposed at the engaged position, the teeth 120 of the movement restricting claw 75' engage the teeth 122 of the second hand section 53 in the circumferential direction, whereby the rotation movement of the second hand section 53 in the circumferential direction are restricted.

Note that the above-described movement restricting mechanism 60 may allow the translation movement in the direction of the axis $O_1$ or in the direction intersecting the axis $O_1$. As an example, the hole 84 is formed as an elongated hole extending along the axis $O_2$.

In this case, when the projection 78 of the movement restricting claw 75 is inserted into the hole 84, the translation movement in the axial direction of the second hand section 53 with respect to the first hand section 52 is allowed. According to this configuration, when a force acts on the workpiece gripping section 58 in the axially rearward direction during execution of the above-described step S8 or S22, the force can be absorbed by the elastic member 56.

In the above-described embodiments, the workpiece gripping section 58 includes a plurality of workpiece gripping claws 59. However, the workpiece gripping section may include e.g. an electromagnet or a vacuum, and may be configured to attract and hold the workpiece.

Further, the robot 14 is not limited to a vertical articulated robot, but may be any type of robot, such as a horizontal articulated robot or a parallel link robot. Further, the vision sensor 15 is not limited to a three-dimensional vision sensor, but may be a two-dimensional vision sensor or a sensor of any type capable of detecting the position and orientation of the workpiece W.

While the present disclosure has been described through specific embodiments, the above-described embodiments do not limit the invention as defined by the appended claims.

The invention claimed is:

1. A robot hand comprising:
   a first hand section;
   a second hand section including a workpiece gripping section configured to grip a workpiece;
   an elastic member configured to connect the first hand section and the second hand section to each other in an elastically displaceable manner; and
   a movement restricting mechanism configured to:
   restrict a rotation movement and a translation movement of an elastic displacement of the second hand section with respect to the first hand section, by mechanically coupling the first hand section to the second hand section, and
   allow a rotation movement and a translation movement of an elastic displacement of the second hand section with respect to the first hand section, by mechanically decoupling the first hand section from the second hand section.

2. The robot hand of claim 1, further comprising a position returning mechanism configured to, when a position of the second hand section with respect to the first hand section is displaced from a predetermined initial position when the movement restricting mechanism allows the translation movement of the second hand section, return the position of the second hand section to the initial position.

3. The robot hand of claim 1, wherein the first hand section, the elastic member, and the second hand section are disposed so as to align in a direction,
   wherein the rotation movement is about an axis extending in the direction.

4. The robot hand of claim 1, wherein the first hand section, the elastic member, and the second hand section are disposed coaxially with each other.

5. A robot comprising the robot hand of claim 1.

6. The robot hand of claim 1, wherein the movement restricting mechanism includes:
   a movement restricting claw provided at the first hand section so as to be movable between:
      an engaged position where the movement restricting claw engages the second hand section so as to restrict the rotation movement and the translation movement of the second hand section; and
      a disengaged position where the movement restricting claw disengages from the second hand section; and
   a drive section configured to move the movement restricting claw.

7. The robot hand of claim 6, wherein the movement restricting mechanism includes a plurality of the movement restricting claws.

8. The robot hand of claim 6, wherein the movement restricting claw includes a projection configured to be received in a hole formed in the second hand section so as to engage the hole when the movement restricting claw is disposed at the engaged position.

9. A robot system configured to rotate and insert a circular workpiece into a circular hole, the robot system comprising:
   a robot including a robot hand having:
      a first hand section;
      a second hand section including a workpiece gripping section configured to grip a workpiece;
      an elastic member configured to connect the first hand section and the second hand section to each other in an elastically displaceable manner; and
      a movement restricting mechanism configured to:
      restrict a rotation movement of an elastic displacement of the second hand section with respect to the first hand section, by mechanically coupling the first hand section to the second hand section, and
      allow a rotation movement and a translation movement of an elastic displacement of the second hand section with respect to the first hand section, by mechanically decoupling the first hand section from the second hand section; and a controller configured to control the robot so as to rotate the first hand section about an axis of the rotation movement of the second hand section, and along with which, insert the workpiece gripped by the workpiece gripping section into the hole, when the movement restricting mechanism restricts the rotation movement.

10. A method of gripping a circular workpiece by a robot hand and rotating the workpiece to insert into a circular hole, the robot hand including a first hand section, a second hand section including a workpiece gripping section configured to grip a workpiece, an elastic member configured to connect the first hand section and the second hand section to each other in an elastically displaceable manner, and a movement restricting mechanism configured to restrict a rotation movement of an elastic displacement of the second hand section with respect to the first hand section, by mechanically coupling the first hand section to the second hand section, and allow a rotation movement and a translation movement of an elastic displacement of the second hand section with respect to the first hand section, by mechanically decoupling the first hand section from the second hand section, the method comprising:

operating the movement restricting mechanism to allow the rotation movement of the second hand section by mechanically decoupling the first hand section from the second hand section;

when the movement restricting mechanism mechanically decouples the first hand section from the second hand section and allows the rotation movement of the second hand section, gripping the workpiece by the workpiece gripping section;

operating the movement restricting mechanism to restrict the rotation movement of the second hand section by mechanically coupling the first hand section to the second hand section; and when the movement restricting mechanism mechanically couples the first hand section to the second hand section:

moving the robot hand and arranging the workpiece with respect to the hole such that an axis of the workpiece gripped by the workpiece gripping section coincides with an axis of the hole, and rotating the first hand section about an axis of the rotation movement, and along with which, inserting the workpiece gripped by the workpiece gripping section into the hole.

* * * * *